US011440730B2

(12) United States Patent
Murphy et al.

(10) Patent No.: US 11,440,730 B2
(45) Date of Patent: Sep. 13, 2022

(54) LOADING APPARATUSES AND VEHICLES THAT INCLUDE A LOADING APPARATUS

(71) Applicant: SMLM LLC, Holland, OH (US)

(72) Inventors: Scott Murphy, Holland, OH (US); Lyndsay Murphy, Holland, OH (US)

(73) Assignee: SMLM LLC, Holland, OH (US)

( * ) Notice: Subject to any disclaimer, the term of this patent is extended or adjusted under 35 U.S.C. 154(b) by 43 days.

(21) Appl. No.: 17/086,774

(22) Filed: Nov. 2, 2020

(65) Prior Publication Data

US 2022/0135322 A1 May 5, 2022

(51) Int. Cl.
*B65F 3/04* (2006.01)
*B65G 65/23* (2006.01)
*B60P 1/48* (2006.01)

(52) U.S. Cl.
CPC .............. *B65F 3/041* (2013.01); *B60P 1/483* (2013.01); *B65F 3/048* (2013.01); *B65G 65/23* (2013.01)

(58) Field of Classification Search
CPC .. B60P 1/48; B60P 1/483; B60P 1/486; B60P 1/5428; B65F 3/04; B65F 3/041; B65F 3/048; B65G 65/23
USPC ........................................ 414/470, 487, 546
See application file for complete search history.

(56) References Cited

U.S. PATENT DOCUMENTS

| | | | |
|---|---|---|---|
| 2,564,250 A * | 8/1951 | Coffee | B60P 1/48 414/553 |
| 3,126,110 A * | 3/1964 | Dinkloh | B60P 1/48 414/553 |
| 3,446,377 A * | 5/1969 | Heinert | B65F 3/04 414/415 |
| 3,604,577 A * | 9/1971 | Heilmeier | B65F 3/04 414/415 |
| 4,057,156 A | 11/1977 | Thompson et al. | |
| 5,846,044 A | 12/1998 | Smith et al. | |
| 5,934,858 A | 8/1999 | Christenson | |
| 6,004,092 A | 12/1999 | Johnson et al. | |
| 6,089,670 A * | 7/2000 | Rogers | B60P 1/486 414/500 |
| 9,399,551 B2 | 7/2016 | Rowland et al. | |
| 9,434,540 B2 | 9/2016 | Goedken et al. | |

(Continued)

FOREIGN PATENT DOCUMENTS

| | | |
|---|---|---|
| AU | 6023190 A | 2/1991 |
| CN | 110775490 A | 2/2020 |

(Continued)

*Primary Examiner* — James Keenan
(74) *Attorney, Agent, or Firm* — MacMillan, Sobanski & Todd, LLC

(57) ABSTRACT

Example loading apparatuses and vehicles that include loading apparatus are described. An example loading apparatus includes a frame, a lift arm, and an anchor member. The frame has a first mounting member, a second mounting member, a first guide rail, and a second guide rail. The first and second guide rails cooperatively define a slot. The lift arm has a lift arm first end, a lift arm second end, a lift arm first portion, and a lift arm second portion. The lift arm first portion is partially disposed within the slot. Each of the lift arm first portion and the lift arm second portion is moveable between a loading position and a dumping position. The anchor member is attached to the lift arm such that the lift arm is pivotable relative to the anchor member and moveable within the slot.

20 Claims, 17 Drawing Sheets

(56) References Cited

U.S. PATENT DOCUMENTS

| | | |
|---|---|---|
| 2003/0031543 A1 | 2/2003 | Elbrink |
| 2004/0170492 A1 | 9/2004 | Neufeldt et al. |
| 2020/0247609 A1 | 8/2020 | Maroney et al. |

FOREIGN PATENT DOCUMENTS

| | | | |
|---|---|---|---|
| CN | 210285521 U | 4/2020 | |
| CN | 210365411 U | 4/2020 | |
| CN | 111422535 A | 7/2020 | |
| CN | 111547421 A | 8/2020 | |
| CN | 211309732 U | 8/2020 | |
| DE | 69806418 T2 | 10/2002 | |
| WO | WO-0035709 A1 * | 6/2000 | ............. B60P 1/483 |

* cited by examiner

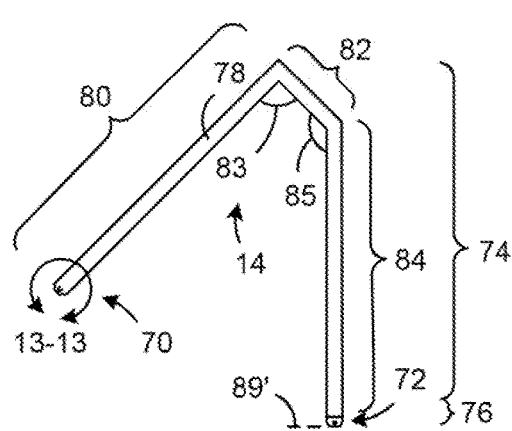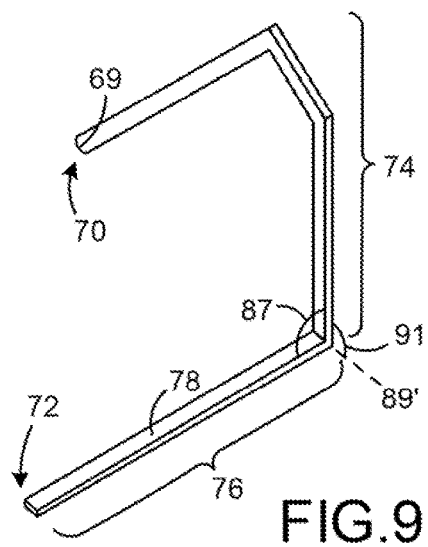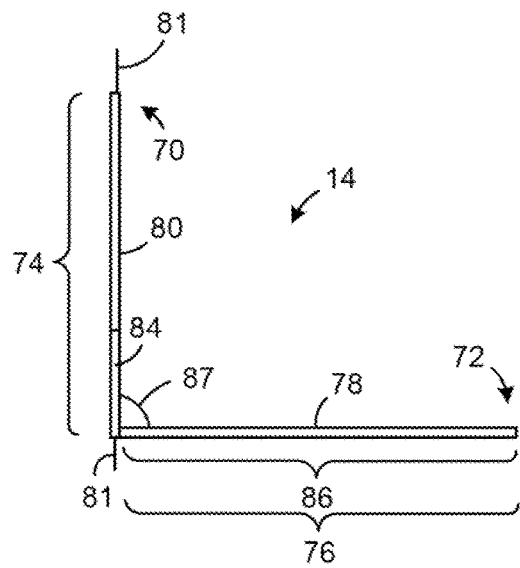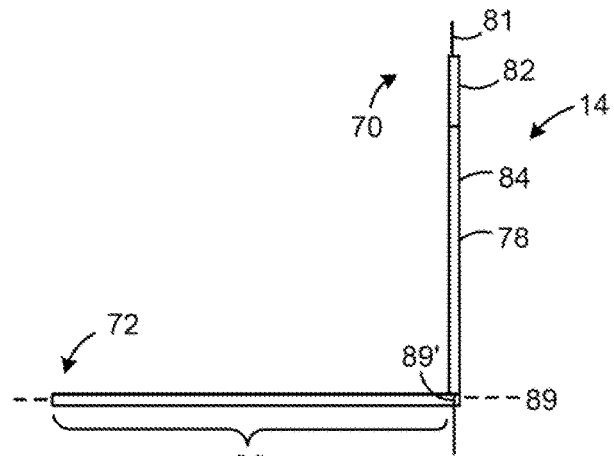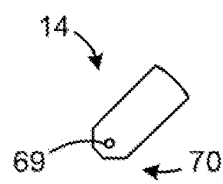
FIG.10
FIG.9
FIG.11
FIG.12
FIG.13

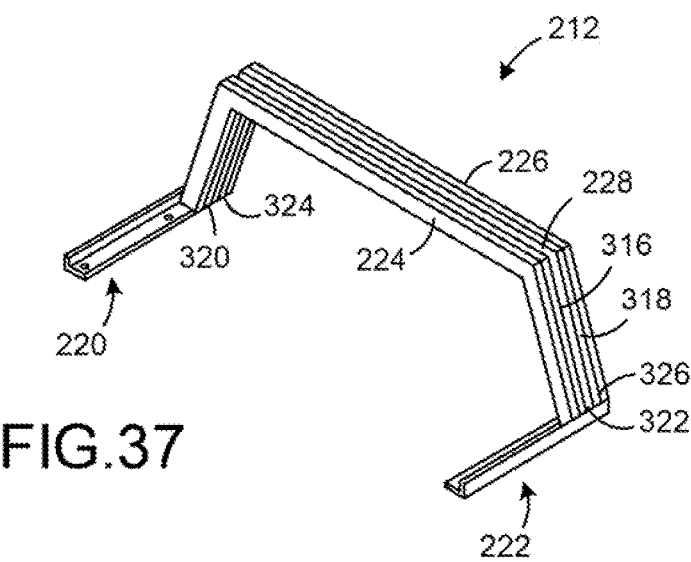
FIG.37
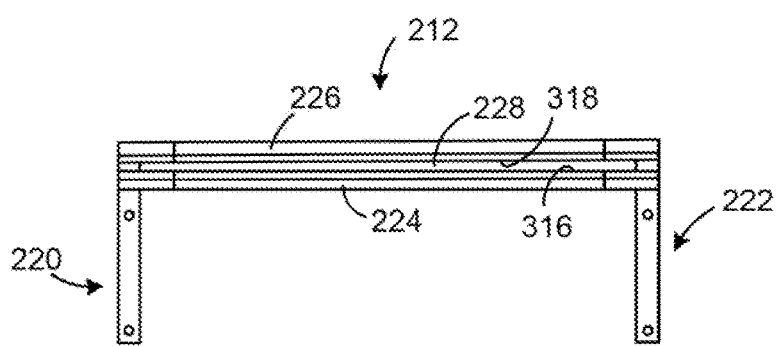
FIG.39
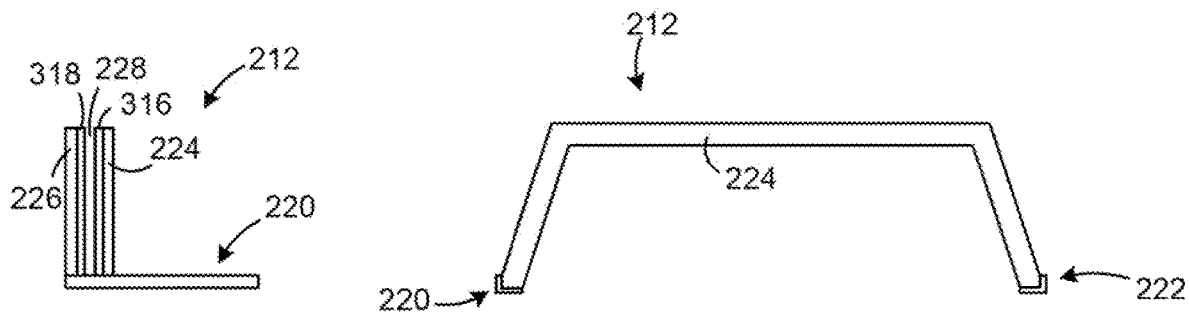
FIG.40
FIG.38

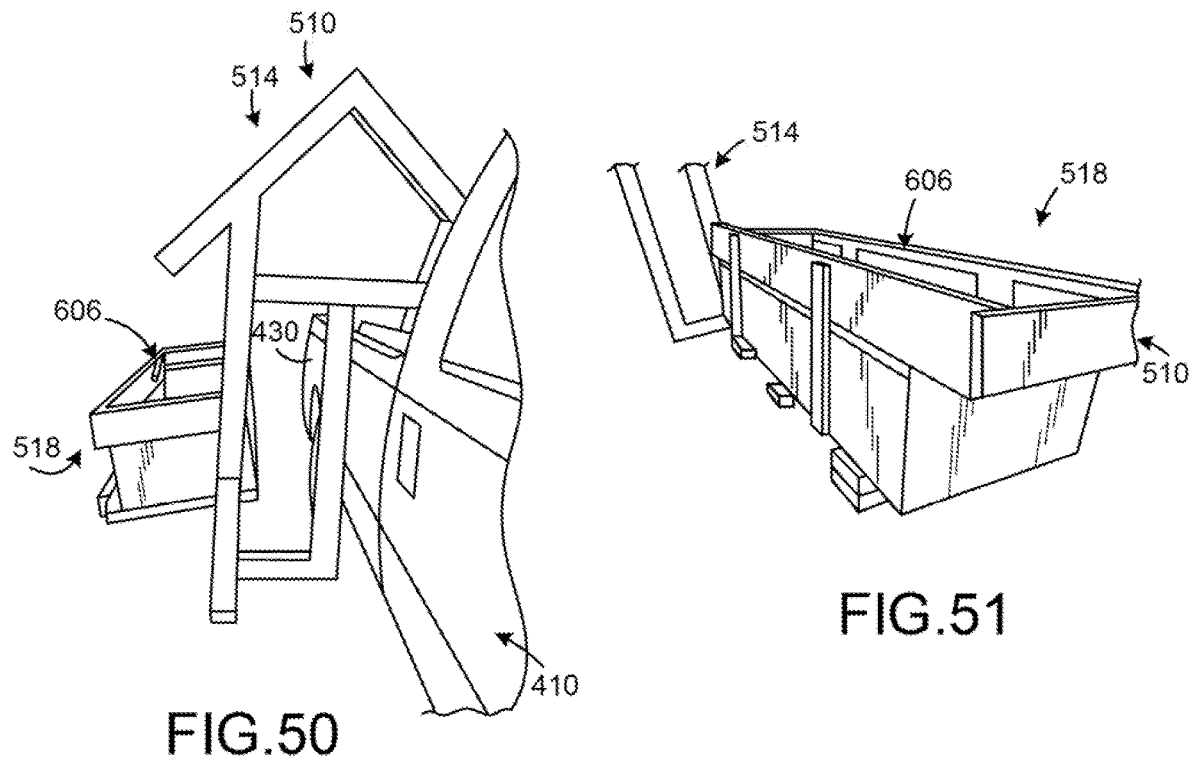
FIG.50
FIG.51
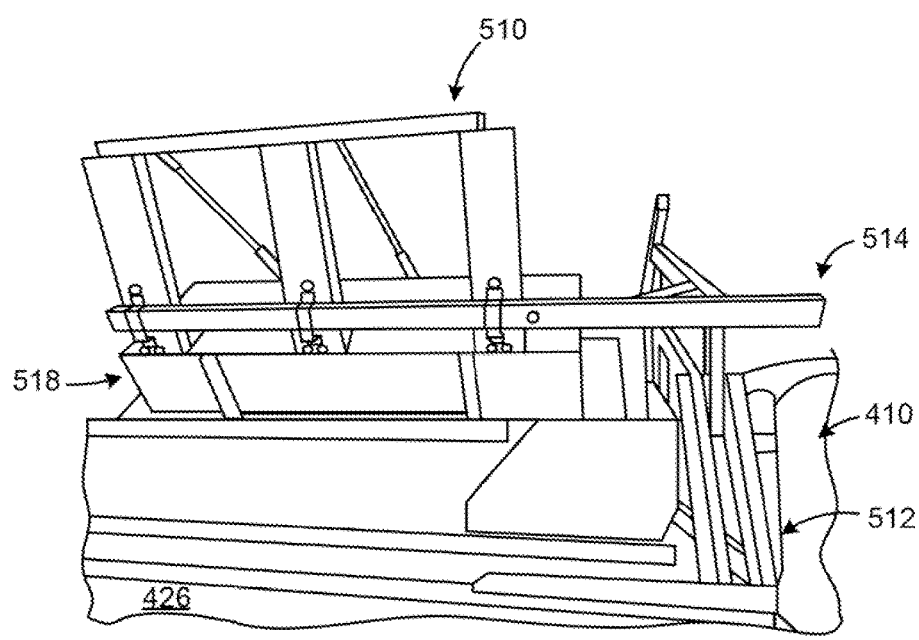
FIG.52

LOADING APPARATUSES AND VEHICLES THAT INCLUDE A LOADING APPARATUS

FIELD

The disclosure relates generally to the field of material collection. More particularly, the disclosure relates to loading apparatuses and vehicles that include a loading apparatus.

BACKGROUND

Conventionally, material collection containers are detached from collection vehicles and are categorized as being front end loading, side loading, or rear end loading. The methods used to collect material disposed within these containers are considerably different and, as a result, the structural arrangement of the containers are exclusive of one another. For example, front end loading containers generally include channels built into the sides of the container, which require a specialized collection vehicle with a pair of spaced forks to collect the material within the container. Collection of materials from side loading containers also require a specialized collection vehicle, which utilizes a pocketed assembly positioned into a specialized hooked plate attached to the container. Similarly, rear end loading containers require a specialized collection vehicle that has a lowered back-end configured to engage each end of a trunnion on the container such that a cable at the rear of the vehicle can be pulled to lift the container off of the ground and empty its contents into a vehicle.

Since the methods of collection are considerably different from one another and the containers include structural arrangements that are exclusive of one another, companies associated with the collection of materials are required to maintain a large inventory of collection vehicles and containers, which increases costs and decreases efficiency when collecting materials. A need exists, therefore, for new and useful loading apparatuses and vehicles that include a loading apparatus for collecting materials.

SUMMARY OF SELECTED EXAMPLE EMBODIMENTS

Various example loading apparatuses and vehicles that include a loading apparatus are described herein.

An example loading apparatus includes a frame, a lift arm, and an anchor member. The frame has a first mounting member, a second mounting member, a first guide rail, and a second guide rail. Each of the first and second guide rails is attached to the first mounting member and the second mounting member and extends from the first mounting member to the second mounting member. The first and second guide rails cooperatively define a slot. The lift arm has a lift arm first end, a lift arm second end, a lift arm first portion, and a lift arm second portion. The lift arm first portion extends from the lift arm first end to the lift arm second portion and is partially disposed within the slot. The lift arm second portion extends from the lift arm first portion to the lift arm second end. Each of the lift arm first portion and the lift arm second portion is moveable between a loading position and a dumping position. The lift arm first portion is disposed a first distance from the first mounting member when in the loading position and a second distance from the first mounting member when in the dumping position. The lift arm second portion is disposed a third distance from the first mounting member when in the loading position and a fourth distance from the first mounting member when in the dumping position. The first distance is greater than the second distance. The third distance is greater than the fourth distance. The anchor member is attached to the lift arm such that the lift arm is pivotable relative to the anchor member and moveable within the slot.

Another example loading apparatus includes a frame, a lift arm, an anchor member, an actuator, and a container. The frame has a first mounting member, a second mounting member, a first guide rail, and a second guide rail. Each of the first and second guide rails is attached to the first mounting member and the second mounting member and extends from the first mounting member to the second mounting member. The first and second guide rails cooperatively define a slot. The lift arm has a lift arm first end, a lift arm second end, a lift arm first portion, and a lift arm second portion. The lift arm first portion extends from the lift arm first end to the lift arm second portion and is partially disposed within the slot. The lift arm second portion extends from the lift arm first portion to the lift arm second end. Each of the lift arm first portion and the lift arm second portion is moveable between a loading position and a dumping position. The lift arm first portion is disposed a first distance from the first mounting member when in the loading position and a second distance from the first mounting member when in the dumping position. The second portion disposed a third distance from the first mounting member when in the loading position and a fourth distance from the first mounting member when in the dumping position. The first distance is greater than the second distance. The third distance is greater than the fourth distance. The lift arm second portion has a first elongate member. The first elongate member has a first lengthwise axis and a second axis disposed orthogonally to the first lengthwise axis. The second axis is disposed at an angle relative to the lift arm first portion between about 90 degrees and about 130 degrees. The anchor member is attached to the lift arm such that the lift arm is pivotable relative to the anchor member and moveable within the slot. The actuator is attached to the anchor member and the lift arm. The container is pivotably attached to the lift arm second portion.

Another example loading apparatus includes a frame, a lift arm, an anchor member, an actuator, and a container. The frame has a first mounting member, a second mounting member, a first guide rail, and a second guide rail. Each of the first and second guide rails is attached to the first mounting member and the second mounting member and extends from the first mounting member to the second mounting member. The first and second guide rails cooperatively define a slot. The lift arm has a lift arm first end, a lift arm second end, a lift arm first portion, and a lift arm second portion. The lift arm first portion extends from the lift arm first end to the lift arm second portion and is partially disposed within the slot. The lift arm second portion extends from the lift arm first portion to the lift arm second end. Each of the lift arm first portion and the lift arm second portion is moveable between a loading position and a dumping position. The lift arm first portion is disposed a first distance from the first mounting member when in the loading position and a second distance from the first mounting member when in the dumping position. The second portion disposed a third distance from the first mounting member when in the loading position and a fourth distance from the first mounting member when in the dumping position. The first distance is greater than the second distance. The third distance is greater than the fourth distance. The lift arm first portion has a first elongate member, a second elongate member, and a third elongate member. The first elongate member is pivotably attached to the anchor member. The second elongate member extends from the first elongate member to the third elongate member. The third elongate member is attached to the lift arm second portion. Each of the first elongate member, the second elongate member, and the third elongate member is disposed on a hypothetical plane that extends through the slot. The lift arm second portion has a fourth elongate member. The fourth elongate member has a first lengthwise axis and a second axis disposed orthogonally to the first lengthwise axis. The second axis is disposed at an angle relative to the lift arm first portion between about 90 degrees and about 130 degrees. The anchor member is attached to the lift arm such that the lift arm is pivotable relative to the anchor member and moveable within the slot. The actuator is attached to the anchor member and the lift arm. The container is pivotably attached to the lift arm second portion.

Additional understanding of these examples can be obtained by review of the detailed description, below, and the appended drawings.

BRIEF DESCRIPTION OF THE DRAWINGS

FIG. 9 is a perspective view of the lift arm of the loading apparatus illustrated in FIG. 1 free of the loading apparatus.

FIG. 10 is a rear view of the lift arm illustrated in FIG. 9.

FIG. 11 is a right side view of the lift arm illustrated in FIG. 9.

FIG. 12 is a left view of the lift arm illustrated in FIG. 9.

FIG. 13 is a magnified view of Area 13-13 shown in FIG. 10.

FIG. 37 is a perspective view of the frame of the loading apparatus illustrated in FIG. 22 free of the loading apparatus.

FIG. 38 is a rear view of the frame illustrated in FIG. 37.

FIG. 39 is a top view of the frame illustrated in FIG. 37.

FIG. 40 is a side view of the frame illustrated in FIG. 37.

FIG. 50 is another partial perspective view of the vehicle illustrated in FIG. 47.

FIG. 51 is a partial perspective view of the loading apparatus included on vehicle illustrated in FIG. 47.

FIG. 52 is another partial perspective view of the vehicle illustrated in FIG. 47. The loading apparatus is illustrated in the dumping position.

DETAILED DESCRIPTION OF SELECTED EXAMPLES

Figure 1:
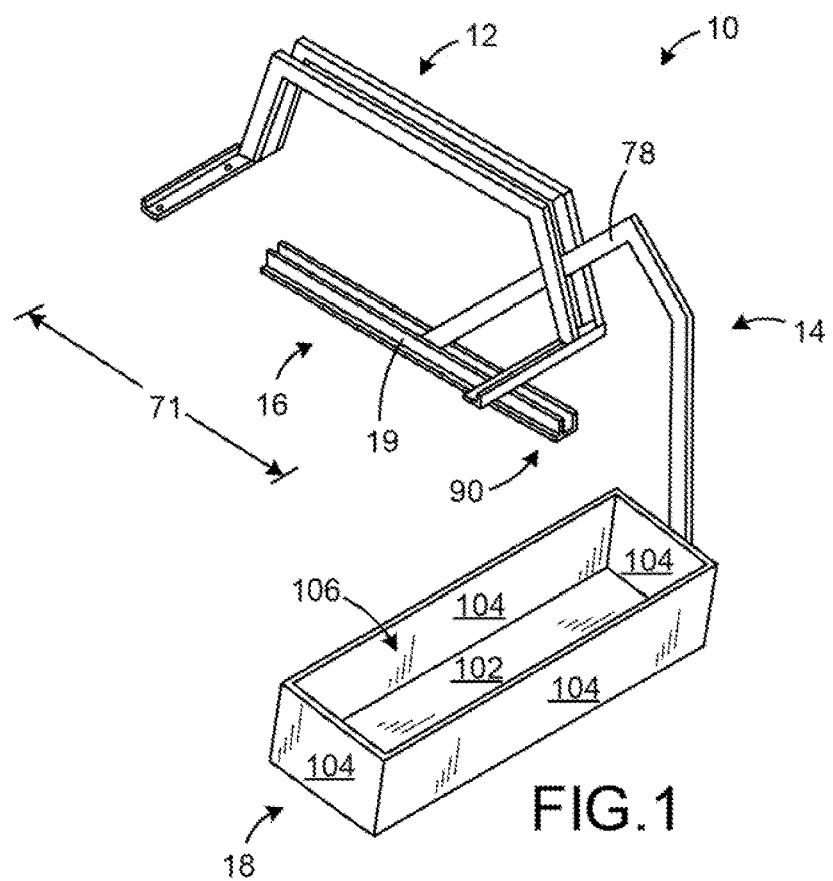
FIG. 1 is a perspective view of an example loading apparatus. The loading apparatus is illustrated in the loading position.

The following detailed description and the appended drawings describe and illustrate various example loading apparatuses and vehicles that include a loading apparatus. The description and illustration of these examples are provided to enable one skilled in the art to make and use a loading apparatus and a vehicle that includes a loading apparatus. They are not intended to limit the scope of the claims in any manner.

FIGS. 1 through 17 illustrate an example loading apparatus 10 that has a frame 12, a lift arm 14, an anchor member 16, a container 18, and an attachment pin 19.

In the illustrated embodiment, and as shown in FIGS. 5 through 8, the frame 12 has a first mounting member 20, a second mounting member 22, a first guide rail 24, and a second guide rail 26. Each of the first and second guide rails 24, 26 is attached to the first mounting member 20 and the second mounting member 22 and extends from the first mounting member 20 to the second mounting member 22. The first and second guide rails 24, 26 cooperatively define a slot 28 that extends from the first mounting member 20 to the second mounting member 22 and between the first and second guide rails 24, 26. However, alternative embodiments can include a slot that extends between first and second mounting members, or from a second mounting member toward a first mounting member.

In the illustrated embodiment, the first mounting member 20 has a first mounting member first end 30, a first mounting member second end 32, a first mounting member lengthwise axis 31 that extends through the first mounting member first end 30 and the first mounting member second end 32, and a first mounting member main body 34. The first mounting member main body 30 defines a plurality of passageways 36 and extends from the first mounting member first end 30 to the first mounting member second end 32. The second mounting member 22 has a second mounting member first end 38, a second mounting member second end 40, a second mounting member lengthwise axis 39 that extends through the second mounting member first end 38 and the second mounting member second end 40, and a second mounting member main body 42. The second mounting member main body 42 defines a plurality of passageways 44 and extends from the second mounting member first end 38 to the second mounting member second end 40. In the embodiment illustrated, each of the first mounting member lengthwise axis 31 and the second mounting member lengthwise axis 39 is disposed on a hypothetical plane 41. However, alternative embodiments can include mounting members that have lengthwise axis that are partially disposed on a hypothetical plane or disposed on separate hypothetical planes. Each of the first mounting member main body 34 and the second mounting member main body 42 defines an L-shaped cross-sectional configuration. However, alternative embodiments can include mounting members that have any suitable cross-sectional configuration capable of accomplishing attachment of a frame to a vehicle (e.g., bed of a truck) or other structure.

The first guide rail 24 has a first guide rail first end 46, a first guide rail second end 48, a first guide rail first portion 50, a first guide rail second portion 52, a first guide rail third portion 54, and a first guide rail main body 56 that extends from the first guide rail first end 46 to the first guide rail second end 48. The first guide rail first portion 50 extends from the first mounting member 20 to the first guide rail second portion 52. The first guide rail second portion 52 extends from the first guide rail first portion 50 to the first guide rail third portion 54. The first guide rail third portion 54 extends from the first guide rail second portion 52 to the second mounting member 22. The first guide rail first portion 50 extends away from the first mounting member 20 along a first guide rail hypothetical plane 47 and toward the first guide rail second portion 52 at an angle 49 that is less than 90 degrees. The first guide rail second portion 52 extends away from the first guide rail first portion 50 along the first guide rail hypothetical plane 47 and toward the first guide rail third portion 54 at an angle 51 that is greater than 90 degrees. The first guide rail third portion 54 extends away from the first guide rail second portion 52 along the first guide rail hypothetical plane 47 and toward the second mounting member 22 at an angle 53 that is greater than 90 degrees. The first guide rail third portion 54 extends away from the second mounting member 22 along the first guide rail hypothetical plane 47 and toward the first guide rail second portion 52 at an angle 55 that is less than 90 degrees. The first guide rail 24 is disposed on the first guide rail hypothetical plane 47 and the first guide rail hypothetical plane 47 is disposed at an angle relative to the first mounting member lengthwise axis 31 and the second mounting member lengthwise axis 39. In the illustrated embodiment, the angle is equal to about 90 degrees. However, alternative embodiments can include a first guide rail hypothetical plane that is disposed at any suitable angle relative to a first mounting member lengthwise axis and/or a second mounting member lengthwise axis and/or a first guide rail that is disposed entirely, or partially, on a first guide rail hypothetical plane. As used herein, the term "about" includes variations in the element described by ±10%.

The second guide rail 26 has a second guide rail first end 58, a second guide rail send end 60, a second guide rail first portion 62, a second guide rail second portion 64, a second guide rail third portion 66, and a second guide rail main body 68 that extends from the second guide rail first end 58 to the second guide rail second end 60. The second guide rail first portion 62 extends from the first mounting member 20 to the second guide rail second portion 64. The second guide rail second portion 64 extends from the second guide rail first portion 62 to the second guide rail third portion 66. The second guide rail third portion 66 extends from the second guide rail second portion 64 to the second mounting member 22. The second guide rail first portion 62 extends away from the first mounting member 20 along a second guide rail hypothetical plane 59 and toward the second guide rail second portion 64 at an angle 61 that is less than 90 degrees. The second guide rail second portion 64 extends away from the second guide rail first portion 62 along the second guide rail hypothetical plane 59 and toward the second guide rail third portion 66 at an angle 63 that is greater than 90 degrees. The second guide rail third portion 66 extends away from the second guide rail second portion 64 along the first guide rail hypothetical plane 59 and toward the second mounting member 22 at an angle 65 that is greater than 90 degrees. The second guide rail third portion 66 extends away from the second mounting member 22 along the second guide rail hypothetical plane 59 and toward the second guide rail second portion 64 at an angle 67 that is less than 90 degrees. The second guide rail 26 is disposed on the second guide rail hypothetical plane 59 and the second guide rail hypothetical plane 59 is disposed at an angle relative to the first mounting member lengthwise axis 31 and the second mounting member lengthwise axis 39. In the illustrated embodiment, the angle is equal to about 90 degrees. However, alternative embodiments can include a second guide rail hypothetical plane that is disposed at any suitable angle relative to a first mounting member lengthwise axis and/or a second mounting member lengthwise axis and/or a second guide rail that is disposed entirely, or partially, on a second guide rail hypothetical plane.

Figure 2:
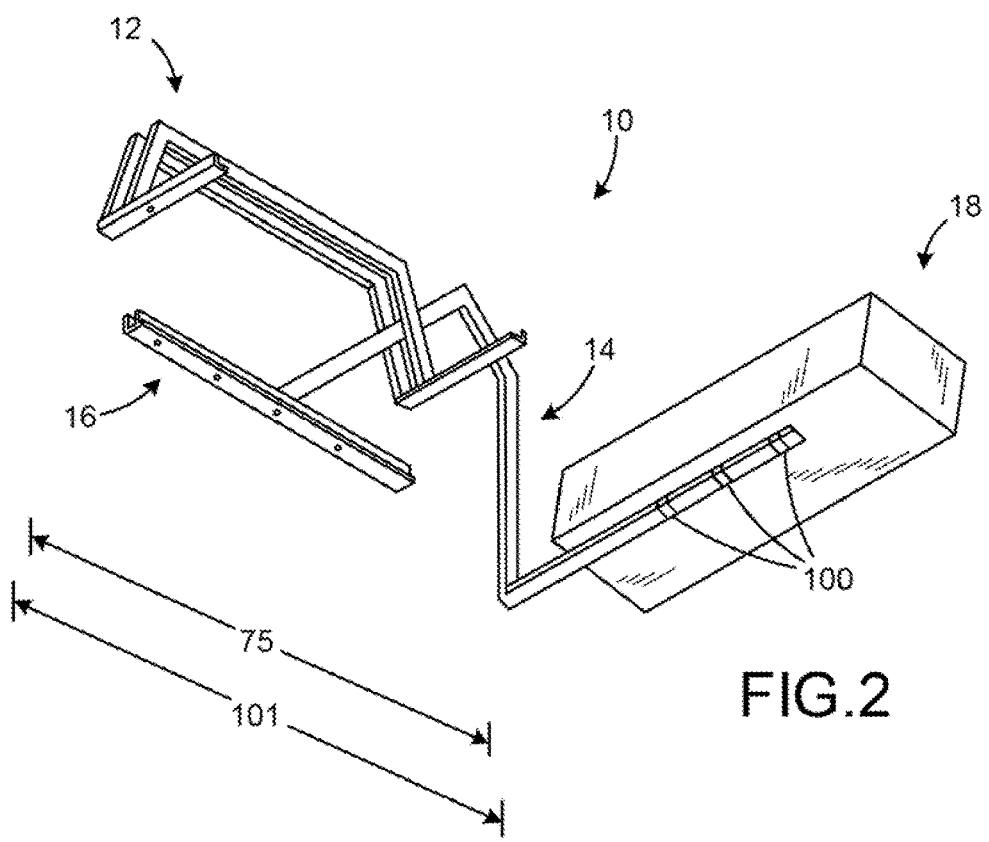
FIG. 2 is another perspective view of the loading apparatus illustrated in FIG. 1.
Figure 3:
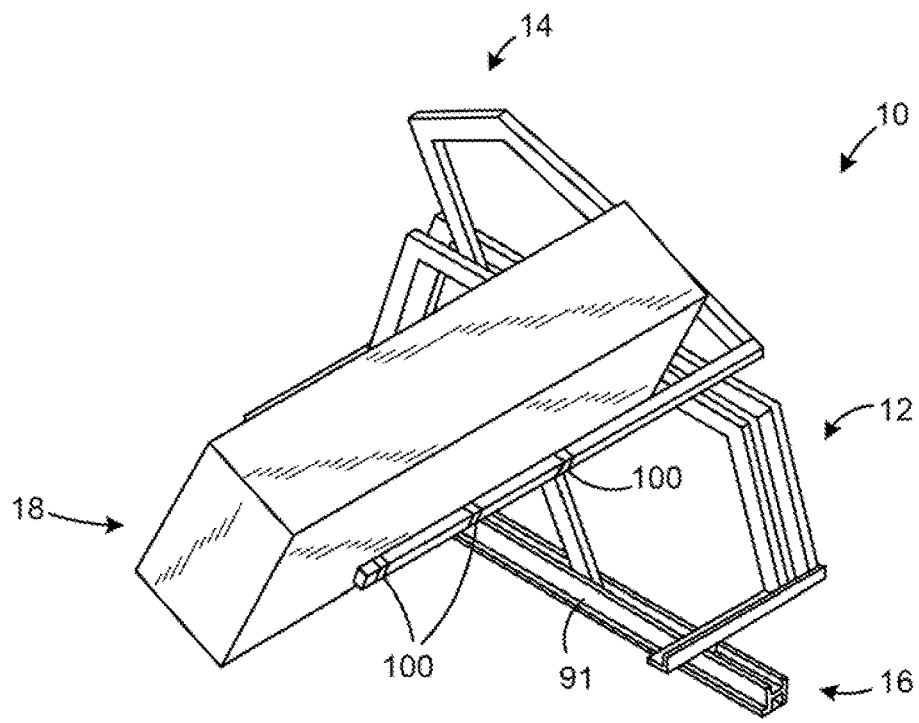
FIG. 3 is another perspective view of the loading apparatus illustrated in FIG. 1. The loading apparatus is illustrated between the loading position and the dumping position.
Figure 4:
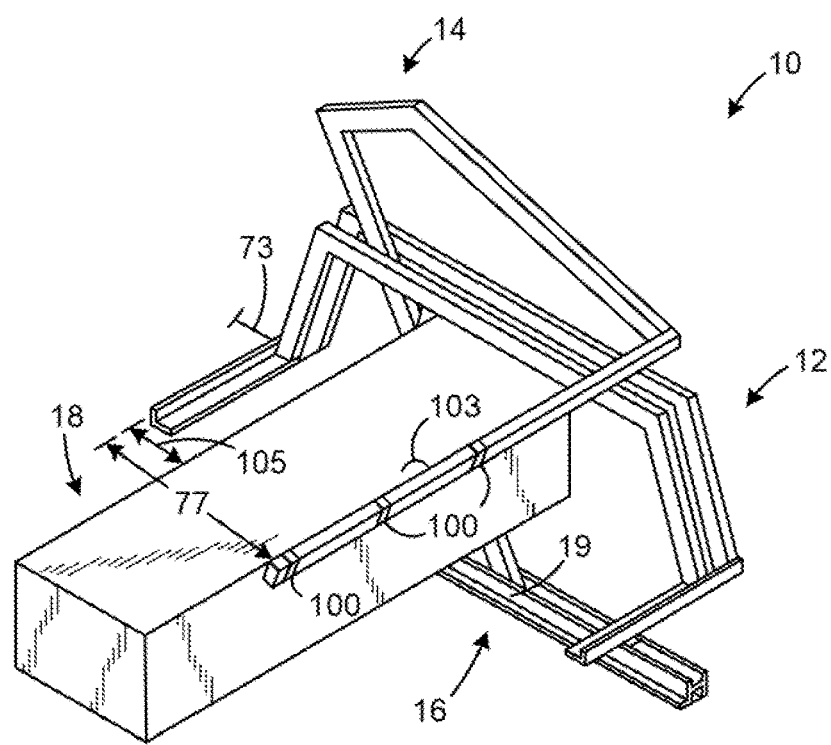
FIG. 4 is another perspective view of the loading apparatus illustrated in FIG. 1. The loading apparatus is illustrated in the dumping position.
Figure 5:
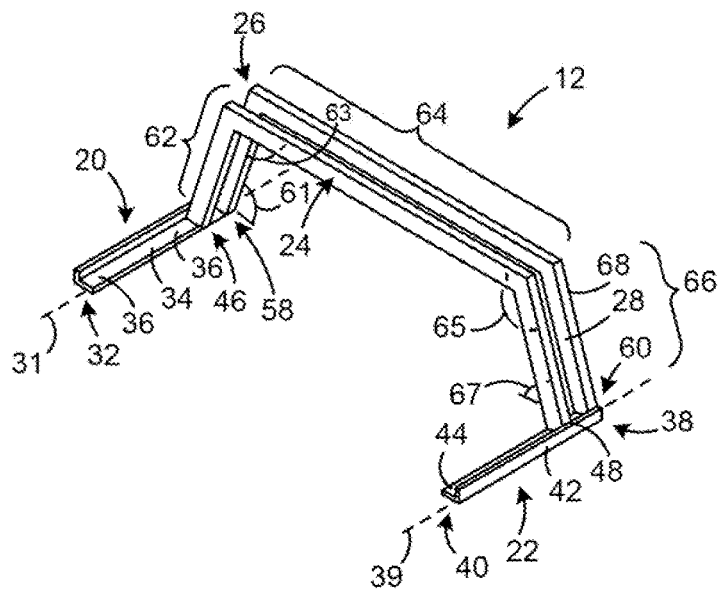
FIG. 5 is a perspective view of the frame of the loading apparatus illustrated in FIG. 1 free of the loading apparatus.
Figure 7:
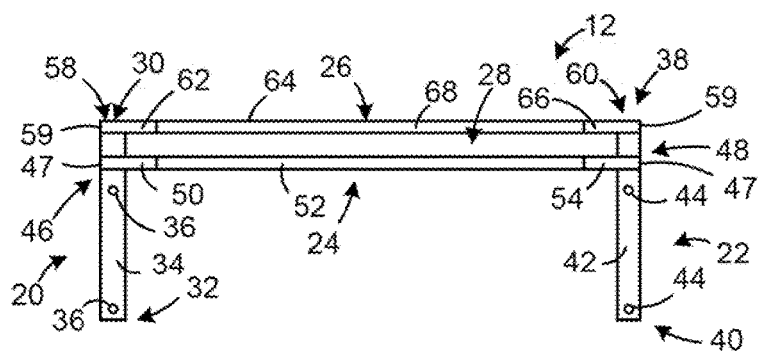
FIG. 7 is a top view of the frame illustrated in FIG. 5.
Figures 6, 8:
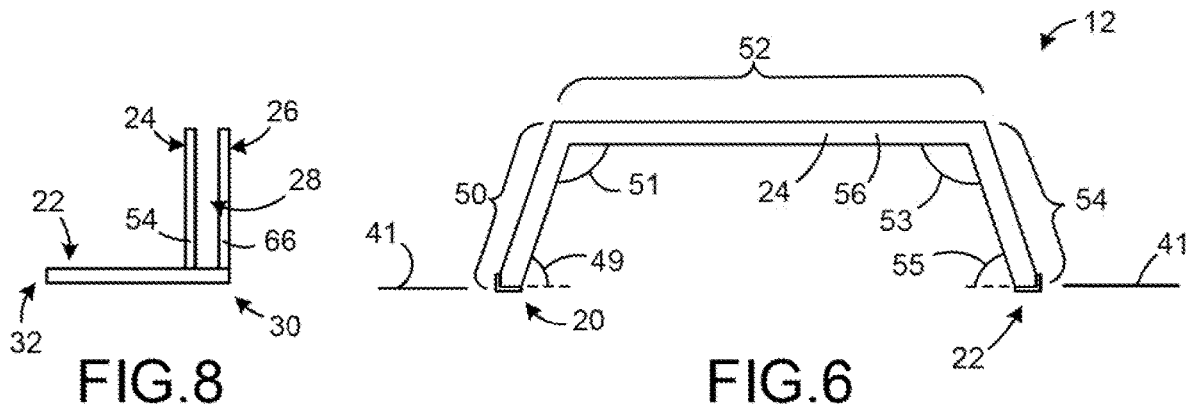
FIG. 6 is a rear view of the frame illustrated in FIG. 5.
FIG. 8 is a side view of the frame illustrated in FIG. 5.

In the illustrated embodiment, and as shown in FIGS. 9, 10, 11, 12, and 13, the lift arm 14 has a lift arm first end 70, a lift arm second end 72, a lift arm first portion 74, a lift arm second portion 76, a lift arm main body 78 that extends from the lift arm first end 70 to the lift arm second end 72 and defines an opening 69. The opening 69 is sized to receive the attachment pin 19 such that when the lift arm first portion 74 is pivotably attached to the anchor member 16 the attachment pin 19 is disposed through the opening 69 and the first set of openings 97 defined by the anchor member 16, as described in more detail herein. The lift aim first portion 74 extends from the lift arm first end 70 to the lift aim second portion 76 and is partially disposed within the slot 28 defined by the frame 12. The lift arm second portion 76 extends from the lift arm first portion 74 to the lift atm second end 72. Each of the lift arm first portion 74 and the lift arm second portion 76 is moveable between a loading position, as shown in FIGS. 1 and 2, and a dumping position, as shown in FIG. 4. As shown in FIGS. 1 and 4, the lift arm first portion 74 is disposed a first distance 71 from the first mounting member 20 when the lift arm 14 is in the loading position and a second distance 73 from the first mounting member 20 when the lift arm 14 is in the dumping position. As shown in FIGS. 2 and 4, the lift atm second portion 76 is disposed a third distance 75 from the first mounting member 20 when the lift arm 14 is in the loading position and a fourth distance 77 from the first mounting member 20 when the lift arm 14 is in the dumping position. The first distance 71 is greater than the second distance 73 and the third distance 75 is greater than the fourth distance 77.

The lift arm first portion 74 has a first elongate member 80, a second elongate member 82, and a third elongate member 84. Each of the first elongate member 80, the second elongate member 82, and the third elongate member 84 is disposed on a hypothetical plane 81 that extends through the slot 28. However, alternative embodiments can include a lift arm first portion that is only partially disposed on a hypothetical plane that extends through a slot. The first elongate member 80 is pivotably attached to the anchor member 16, as described in more detail herein. The second elongate member 82 extends from the first elongate member 80 to the third elongate member 84 at an angle 83 that is greater than 90 degrees. The third elongate member 84 extends from the second elongate member 82 an angle 85 that is greater than 90 degrees and is attached to the lift arm second portion 76 at an angle 87 that is equal to about 90 degrees.

The lift arm second portion 76 has a first elongate member 86 attached to the lift arm first portion 74 (e.g., third elongate member 84), a first lengthwise axis 89 that is parallel to the first mounting member lengthwise axis 31 and the second mounting member lengthwise axis 39, and a second axis 89' disposed orthogonally to the first lengthwise axis 89. The first elongate member 86 is attached to the third elongate member 84 such that the first lengthwise axis 89 is disposed orthogonally relative to the third elongate member 84 of the lift arm first portion 74 and the second axis 89' is disposed at an angle 91 equal to about 90 degrees relative to the lift arm first portion 74 (e.g., third elongate member 84). The first lengthwise axis 89 of the lift arm second portion 76 extends perpendicular to the hypothetical plane 81 on which each of the first elongate member 80, the second elongate member 82, and the third elongate member 84 is disposed. However, alternative embodiments can include a lift arm second portion that has a lengthwise axis that extends at any suitable angle relative to a mounting member lengthwise axis, a lift member first portion, and/or a hypothetical plane that extends through a slot.

In the embodiment illustrated, and as shown in FIGS. 14, 15, 16, and 17, the anchor member 16 has an anchor member first end 88, an anchor member second end 90, an anchor member lengthwise axis 93 that extends through the anchor member first end 88 and the anchor member second end 90, and an anchor member main body 92 that defines a plurality of openings 94 and a plurality of plates 95. The anchor member main body 92 extends from the anchor member first end 88 to the anchor member second end 90. As described herein, the lift member first portion 74 (e.g., first elongate member 80) is pivotably attached to the anchor member 16. In the embodiment illustrated, the anchor member lengthwise axis 93 is disposed on the hypothetical plane 81 on which each of the first elongate member 80, the second elongate member 82, and the third elongate member 84 is disposed. However, alternative embodiments can include an anchor member that has a lengthwise axis that is partially disposed on, or extends at an angle relative to, a hypothetical plane on which the entirety of, or a portion, of a lift arm first portion is disposed. The anchor member main body 92 defines a U-shaped cross-sectional configuration that defines a channel 96. In addition, the anchor member main body 92 defines a projection 98 that extends from the U shaped portion of the anchor member 16 and away from the lengthwise axis 93. Each plate of the plurality of plates 95 is disposed within the channel 96 and provide structural support for the anchor member 16. For example, in some embodiments, an anchor member can be formed by attaching two L-shaped members (e.g., 3 inch steel angle iron pieces welded together) to one another and attaching a plurality of plates between the L-shaped members to increase the structural stability of the anchor member. However, alternative embodiments can include anchor members that have any suitable structural arrangement capable of accomplishing attachment of an anchor member to a vehicle or other structure (e.g., the base of a bed of a truck). A first set of openings 97 of the plurality of openings 94 is defined on the U-shaped portion of the anchor member 16 and are sized to receive a portion of the pin 19 to accomplish pivotable attachment of the lift arm 14 to the anchor member 16. A second set of openings 99 of the plurality of openings 94 is defined on the U-shaped portion of the anchor member 16 and the projection 98 and are sized to receive an attachment member (e.g., screw, bolt) to accomplish attachment of the anchor member 16 to a vehicle. While illustrated as included in a loading apparatus, a plurality of plates can be omitted from an anchor member and/or an anchor member and/or an attachment pin can be omitted from a loading apparatus.

In the illustrated embodiment, the container 18 is pivotably attached to the lift arm second portion 76 (e.g., elongate member 86) using a plurality of hinges 100 and includes a base 102, a plurality of walls 104, and a cavity 106 within which material can be placed. Any suitable hinge can be utilized to attach a container 18 to a lift arm 14 and selection of a suitable hinge can be based on various considerations, including the intended use of a loading apparatus. Examples of suitable hinges include hinges formed of any suitable material, gate hinges, such as 3.8 inch galvanized gate hinges, and any other hinge considered suitable for a particular embodiment. While illustrated as included in a loading apparatus, a container can be omitted from a loading apparatus. While the container 18 has been illustrated as pivotably attached to the lift arm second portion 76 using a plurality of hinges 100, a container can be pivotably attached to a lift arm second portion using any suitable type of pivotable attachment. Selection of a suitable type of pivotable attachment between a container and a lift arm second portion can be based on various considerations, including the material(s) forming a container and/or lift arm.

When the lift arm first portion 74 and the lift arm second portion 76 are in the loading position, as shown in FIGS. 1 and 2, the container 18 is positioned in an upright position such that material (e.g., waste) can be placed within the cavity 106. In the loading position, the base 102 of the container 18 is disposed adjacent to the lift arm second portion 76 (e.g., contacts the lift arm second portion 76) and the container 18 is disposed a fifth distance 101 from the first mounting member 20. When the lift arm first portion 74 and the lift arm second portion 76 are in the dumping position, as shown in FIG. 4, the container 18 inverts and is positioned in an inverted position such that any material disposed within the cavity 106 empties from the container and is dumped into the vehicle (e.g., bed of a truck) to which the loading apparatus 10 is attached. In the dumping position, as shown in FIG. 4, the base 102 of the container 18 is disposed at an angle 103 to the lift arm second portion 76 that is greater than 90 degrees and the container 18 is disposed a sixth distance 105 from the first mounting member 20 that is less than the fifth distance 101.

Figure 14:
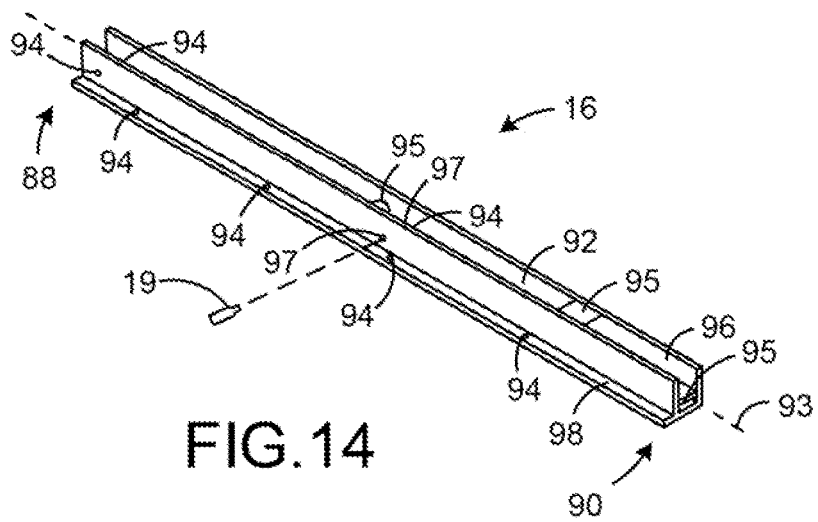
FIG. 14 is a perspective view of the anchor member and attachment pin of the loading apparatus illustrated in FIG. 1 free of the loading apparatus.
Figure 16:
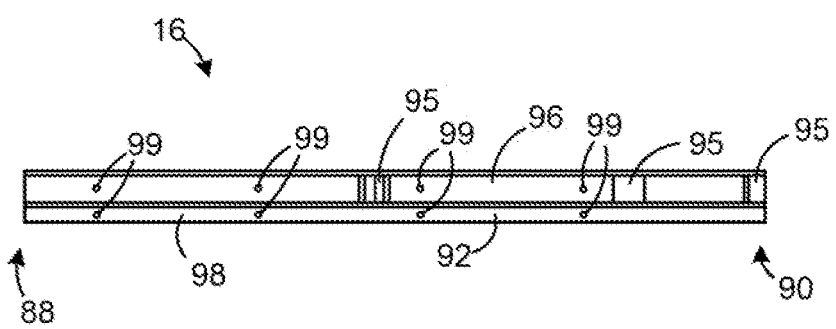
FIG. 16 is a top view of the anchor member illustrated in FIG. 14.
Figures 15, 17:
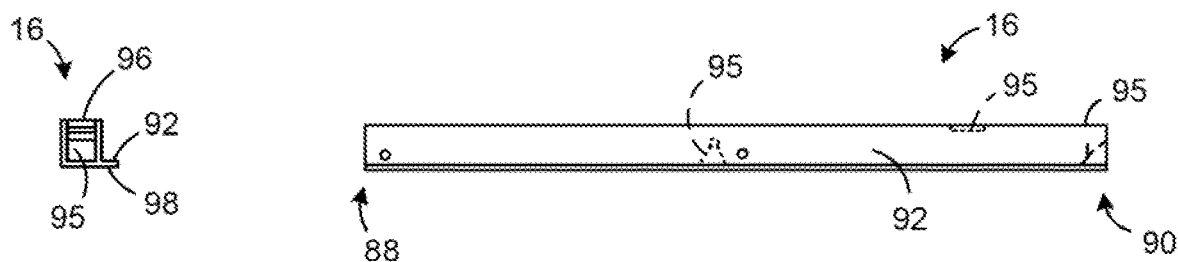
FIG. 15 is a rear view of the anchor member illustrated in FIG. 14.
FIG. 17 is a side view of the anchor member illustrated in FIG. 14.
Figure 18:
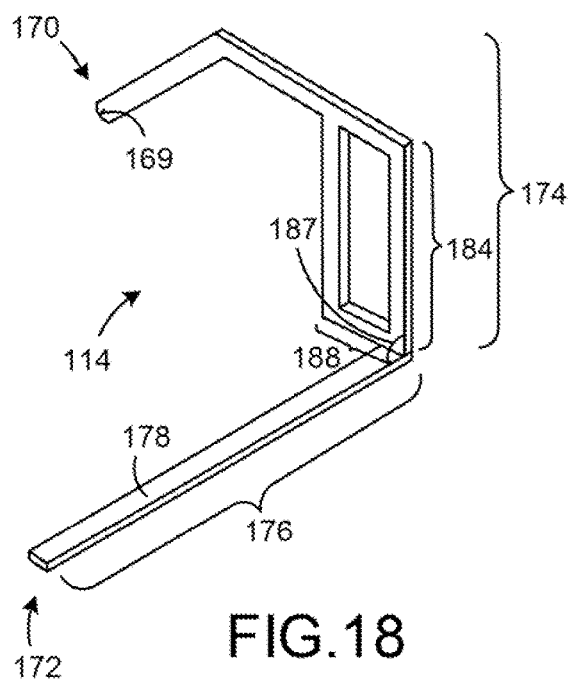
FIG. 18 is a perspective view of an alternative lift arm that can be used in a loading apparatus.
Figure 19:
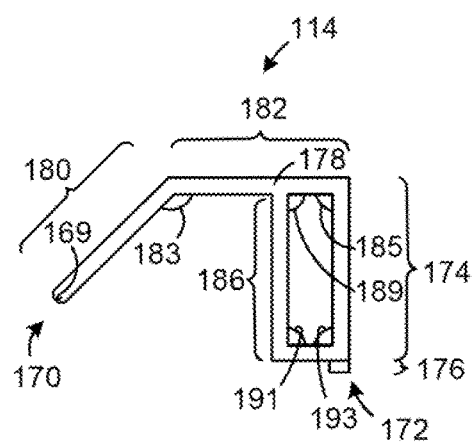
FIG. 19 is a rear view of the lift arm illustrated in FIG. 18.
Figure 20:
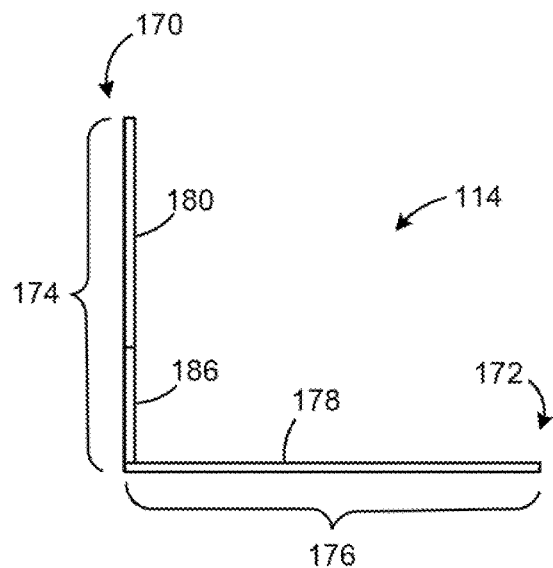
FIG. 20 is a right side view of the lift arm illustrated in FIG. 18.
Figure 21:
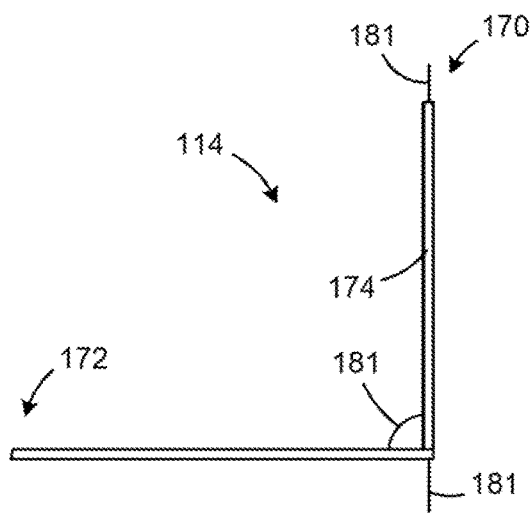
FIG. 21 is a left side view of the lift arm illustrated in FIG. 18.

An attachment pin 19 can have any suitable structural arrangement capable of providing pivotable attachment between a lift arm 14 and an anchor member 16. In the illustrated embodiment, as shown in FIG. 14, the attachment pin 19 is an elongate member that is sized such that it can be positioned through the opening 69 defined by the lift arm 14 and passageways of the plurality of passageways 94 defined by the anchor member 16. Attachment of an attachment pin to an anchor member and/or lift arm can be accomplished using any suitable technique or method of attachment. For example, an attachment pin can be welded to an anchor member. While an attachment pin has been illustrated as accomplishing pivotable attachment between a lift arm and an anchor member, any suitable structure and/or method of accomplishing pivotable attachment between a lift arm and an anchor member can be utilized.

FIGS. 18, 19, 20, and 21 illustrate an alternative lift arm 114 that can be used with a loading apparatus, such as those described herein. The lift arm 114 is similar to the lift arm 14 illustrated in FIGS. 1, 2, 3, 4, 9, 10, 11, 12, and 13 and described above, except as detailed below. In the illustrated embodiment, the lift arm 114 has a lift arm first end 170, a lift arm second end 172, a lift arm first portion 174, a lift arm second portion 176, and a lift arm main body 178 that extends from the lift arm first end 170 to the lift arm second end 172 and defines an opening 169.

The lift arm first portion 174 extends from the lift arm first end 170 to the lift arm second portion 176 and is sized to be partially disposed within a slot defined by a frame. The lift arm second portion 176 extends from the lift arm first portion 174 to the lift arm second end 172. Each of the lift arm first portion 174 and the lift arm second portion 176 is moveable between a loading position and a dumping position.

In the illustrated embodiment, the lift arm first portion 174 has a first elongate member 180, a second elongate member 182, a third elongate member 184, a fourth elongate member 186, and a fifth elongate member 188. Each of the first elongate member 180, the second elongate member 182, the third elongate member 184, the fourth elongate member 186, and the fifth elongate member 188 is disposed on a hypothetical plane 181 that extends through a slot of a frame. The second elongate member 182 extends from the first elongate member 180 at an angle 183 that is greater than 90 degrees. The third elongate member 184 extends from the second elongate member 182 at an angle 185 that is equal to about 90 degrees and is attached to the lift arm second portion 176 at an angle 187 that is equal to about 90 degrees. The fourth elongate member 186 extends from the second elongate member 182 between the first elongate member 180 and the third elongate member 184 at an angle 189 that is equal to about 90 degrees. The fifth elongate member 188 extends from the fourth elongate member 186 at an angle 191 that is equal to about 90 degrees and extends from the third elongate member 184 at an angle 193 that is equal to about 90 degrees.

FIGS. 22 through 46 illustrate another example loading apparatus 210. The loading apparatus 210 is similar to the loading apparatus 10 illustrated in FIGS. 1 through 17 and described above, except as detailed below. In the illustrated embodiment, the loading apparatus 210 has a frame 212, a lift arm 214, an anchor member 216, a container 218, a first attachment pin 219, a second attachment pin 312, an actuator 314, and a third attachment pin 315.

In the illustrated embodiment, and as shown in FIGS. 37 through 40, the frame 212 includes a first slide rail 316 and a second slide rail 318. The first slide rail 316 is attached to the first guide rail 224 within the slot 228 and has a first end 320 disposed at the first mounting member 220 and a second end 322 disposed at the second mounting member 222. The second slide rail 318 is attached to the second guide rail 226 within the slot 228 and has a first end 324 disposed at the first mounting member 220 and a second end 326 disposed at the second mounting member 222. The inclusion of slide rails 316, 318 prevents damage to the guide rails 224, 226 during use by allowing the lift arm 214 to directly contact the slide rails 316, 318 instead of directly contacting the guide rails 224, 226.

In the illustrated embodiment, and as illustrated in FIGS. 41, 42, 43, 44, 45, and 46, the lift arm 214 has a lift arm first end 270, a lift arm second end 272, a lift arm first portion 274, a lift arm second portion 276, and a lift arm main body 278 that extends from the lift arm first end 270 to the lift arm second end 272 defines an opening 269 and an attachment region 326. Attachment region 326 is sized to receive a portion of the actuator 314, as described in more detail herein, and the second pin 312 to accomplish attachment of the actuator 314 to the lift arm 214.

Figure 22:
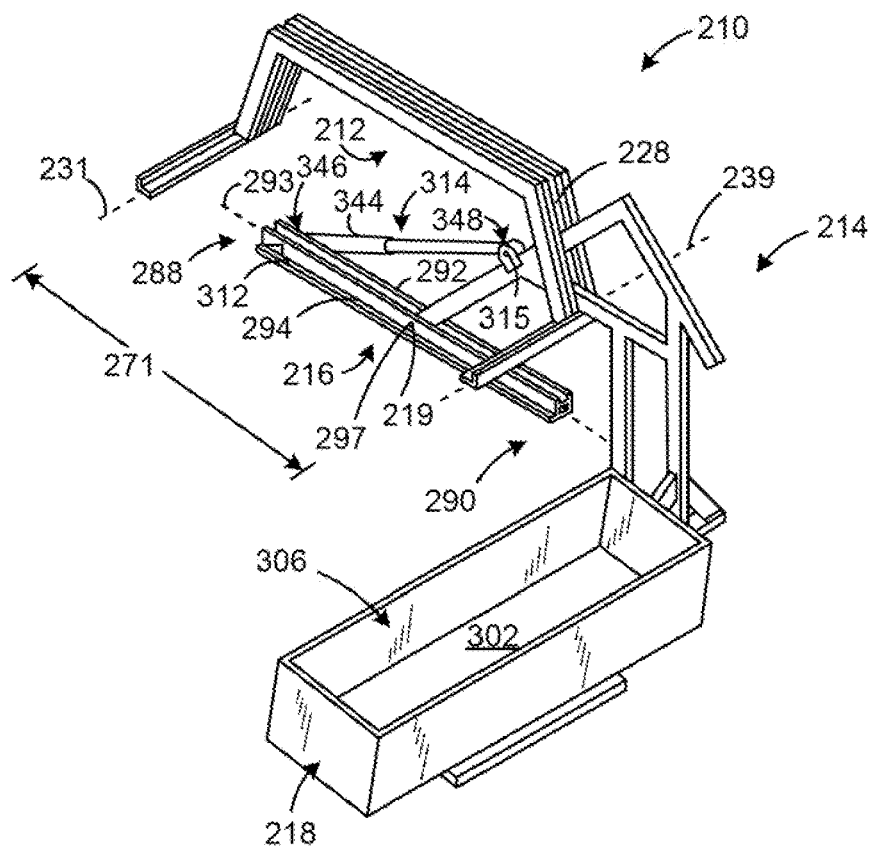
FIG. 22 is a perspective view of another loading apparatus. The loading apparatus is illustrated in the loading position.
Figure 23:
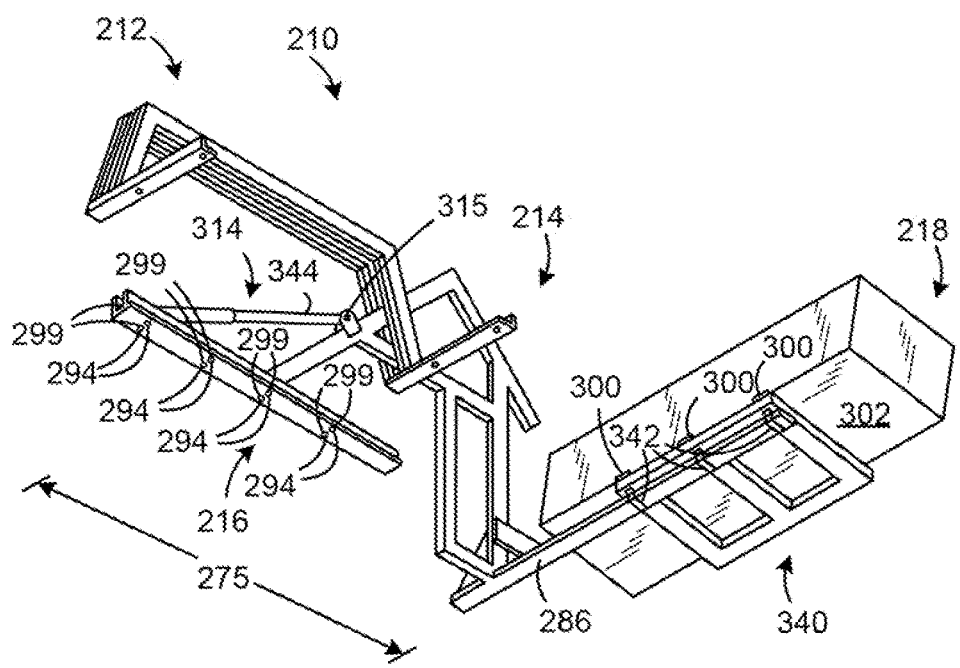
FIG. 23 is another perspective view of the loading apparatus illustrated in FIG. 22.
Figure 32:
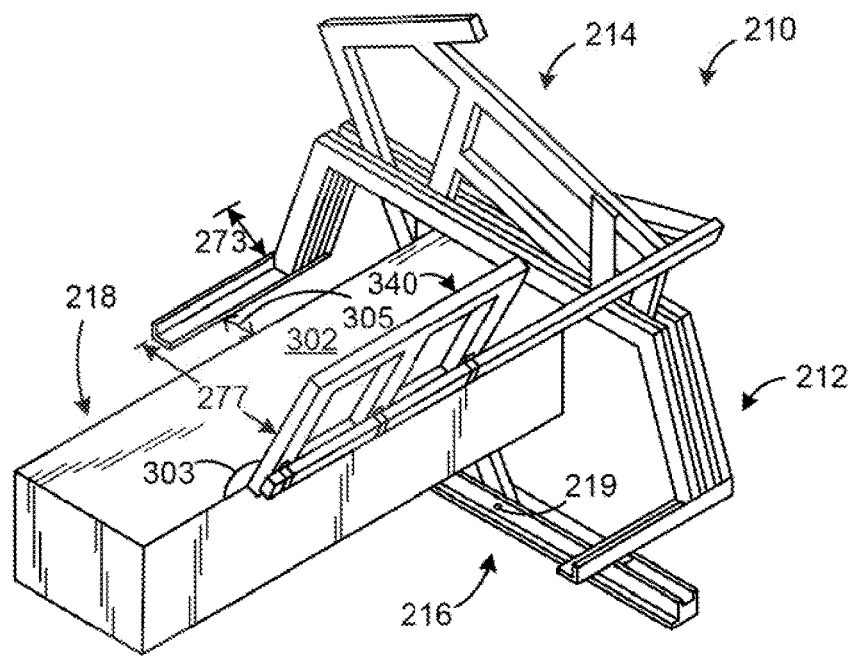
FIG. 32 is another perspective view of the loading apparatus illustrated in FIG. 22. The loading apparatus is illustrated in the dumping position.
Figure 33:
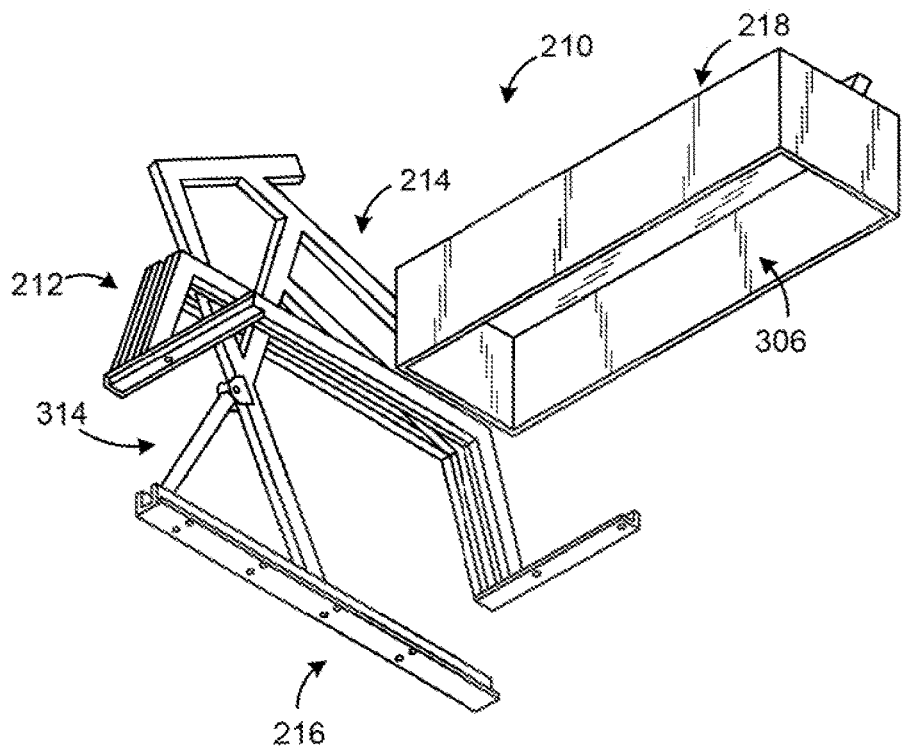
FIG. 33 is another perspective view of the loading apparatus illustrated in FIG. 32.
Figure 34:
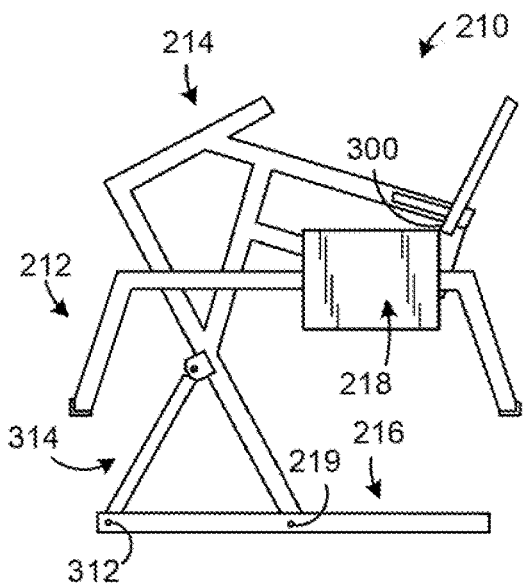
FIG. 34 is a rear view of the loading apparatus illustrated in FIG. 32.
Figure 35:
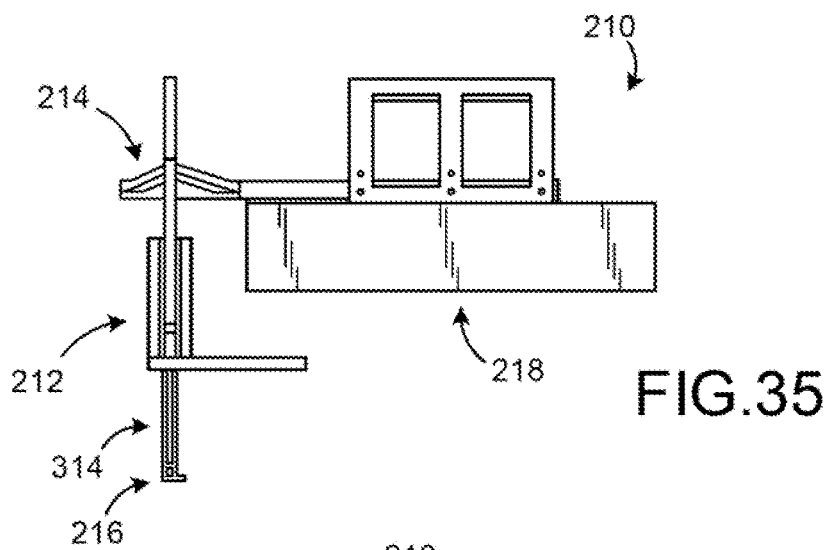
FIG. 35 is a side view of the loading apparatus illustrated in FIG. 32.
Figure 36:
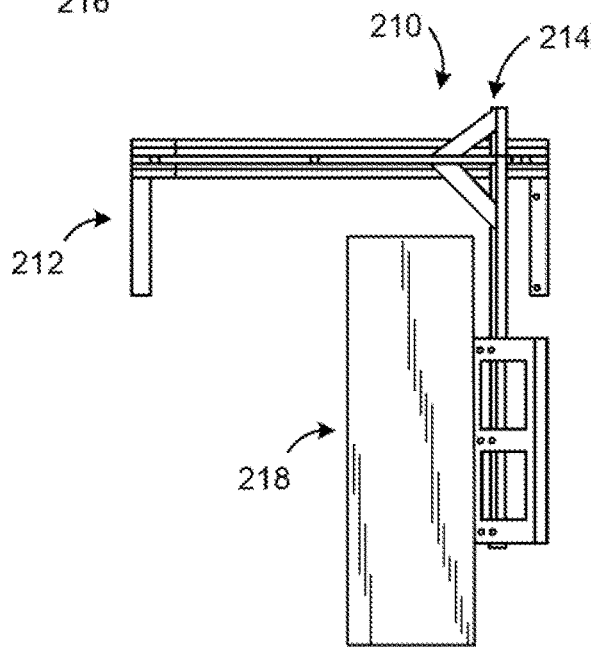
FIG. 36 is a top view of the loading apparatus illustrated in FIG. 32.

The lift arm first portion 274 extends from the lift arm first end 270 to the lift arm second portion 276 and is partially disposed within the slot 228. The lift arm second portion 276 extends from the lift arm first portion 274 to the lift arm second end 272. Each of the lift arm first portion 274 and the lift arm second portion 276 is moveable between a loading position, as shown in FIGS. 22, 23, 24, 25, and 26, and a dumping position, as shown in FIGS. 32, 33, 34, 35, and 36. As shown in FIGS. 22 and 32, the lift arm first portion 274 is disposed a first distance 271 from the first mounting member 220 when the lift arm 214 is in the loading position and a second distance 273 from the first mounting member 220 when the lift arm 214 is in the dumping position. As shown in FIGS. 22 and 32, the lift arm second portion 276 is disposed a third distance 275 from the first mounting member 220 when the lift arm 214 is in the loading position and a fourth distance 277 from the first mounting member 220 when the lift arm 214 is in the dumping position. The first distance 271 is greater than the second distance 273 and the third distance 275 is greater than the fourth distance 277.

In the illustrated embodiment, the lift arm first portion 274 has a first elongate member 280, a second elongate member 282, a third elongate member 284, a fourth elongate member 330, a fifth elongate member 332, and a sixth elongate member 334. Each of the first elongate member 280, the second elongate member 282, the third elongate member 284, the fourth elongate member 330, the fifth elongate member 332, and the sixth elongate member 334 is disposed on a hypothetical plane 281 that extends through the slot 228. The first elongate member 280 is pivotably attached to the anchor member 216, as described in more detail herein. The second elongate member 282 is extends from the first elongate member 280 at an angle 283 that is equal to about 90 degrees. The third elongate member 284 extends from the second elongate member 282 between the first and second ends of the second elongate member 282 at an angle 285 that is greater than 90 degrees and attached to the lift arm second portion 276 at an angle 287 that is equal to about 90 degrees. The fourth elongate member 330 extends from the first elongate member 280 at an angle 325 that is greater than 90 degrees and the third elongate member 284 at an angle 327 that is equal to about 90 degrees. The fifth elongate member 332 extends from the fourth elongate member 330 between the first elongate member 280 and the third elongate member 284 at an angle 329 that is equal to about 90 degrees. The sixth elongate member 334 extends from the fifth elongate member 332 at an angle 331 that is equal to about 90 degrees and the third elongate member 284 at an angle 333 that is equal to about 90 degrees.

Figure 42:
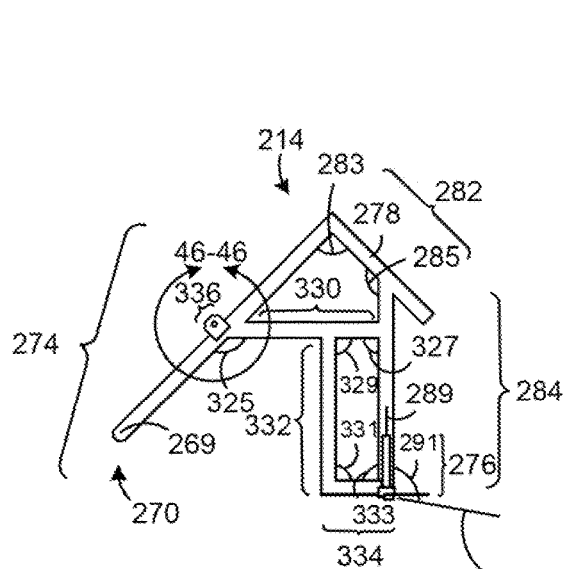
FIG. 42 is a rear view of the lift arm illustrated in FIG. 41.
Figure 41:
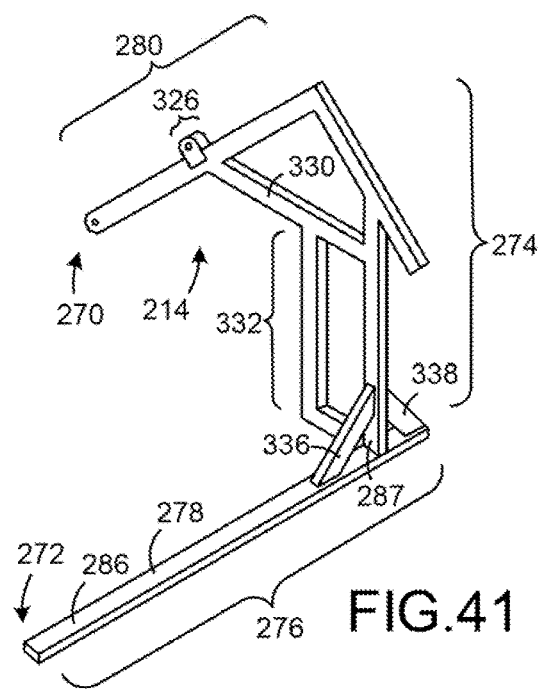
FIG. 41 is a perspective view of the lift arm of the loading apparatus illustrated in FIG. 22 free of the loading apparatus.
Figure 43:
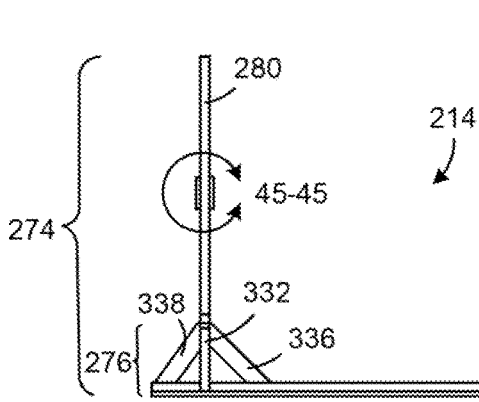
FIG. 43 is a right side view of the lift arm illustrated in FIG. 41.
Figure 44:
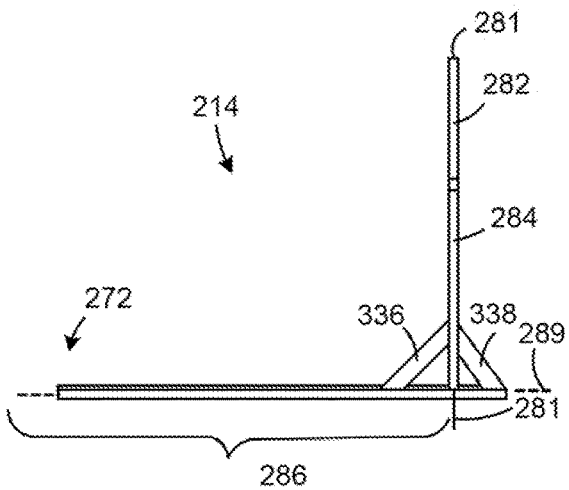
FIG. 44 is a left side view of the lift arm illustrated in FIG. 41.
Figure 45:
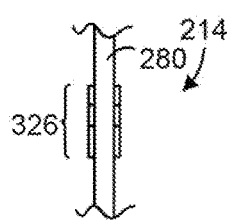
FIG. 45 is a magnified view of Area 45-45 shown in FIG. 43.
Figure 46:
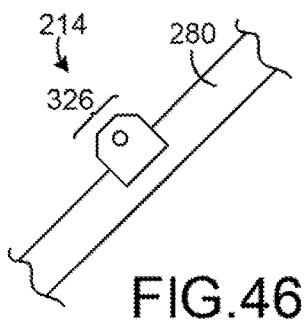
FIG. 46 is a magnified view of Area 46-46 shown in FIG. 42.
Figure 47:
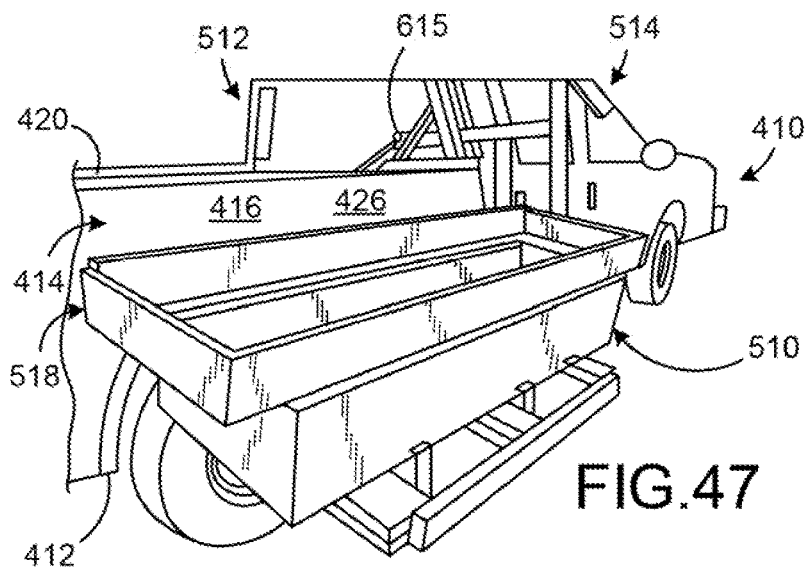
FIG. 47 is a partial perspective view of a vehicle that includes an example loading apparatus. The loading apparatus is illustrated in the loading position.
Figure 48:
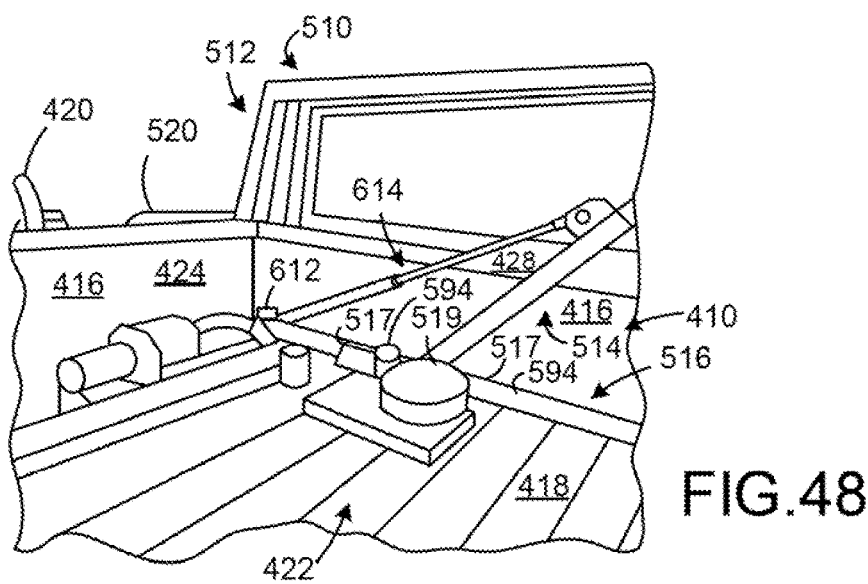
FIG. 48 another partial perspective view of the vehicle illustrated in FIG. 47.
Figure 49:
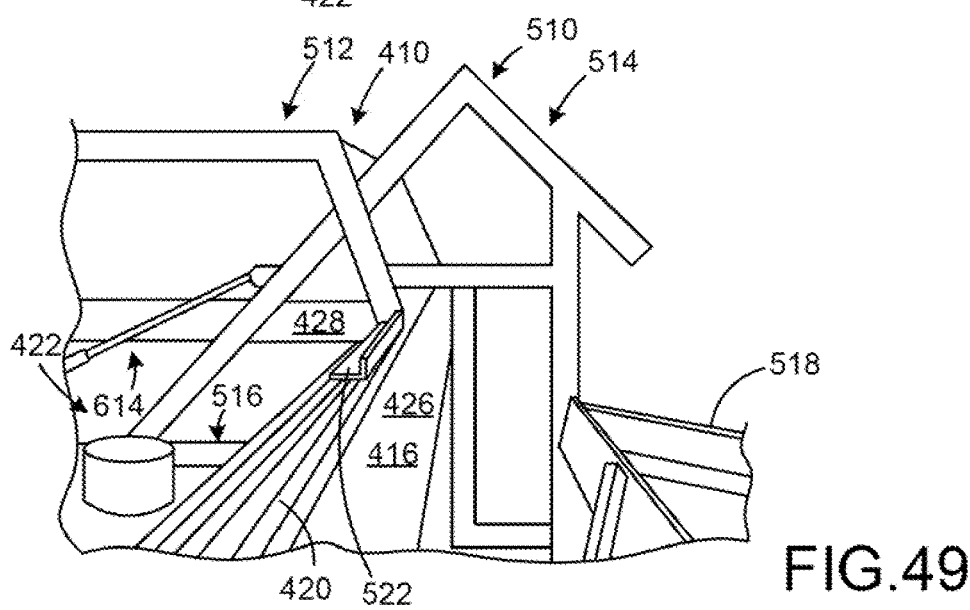
FIG. 49 is another partial perspective view of the vehicle illustrated in FIG. 47.
Figure 53:
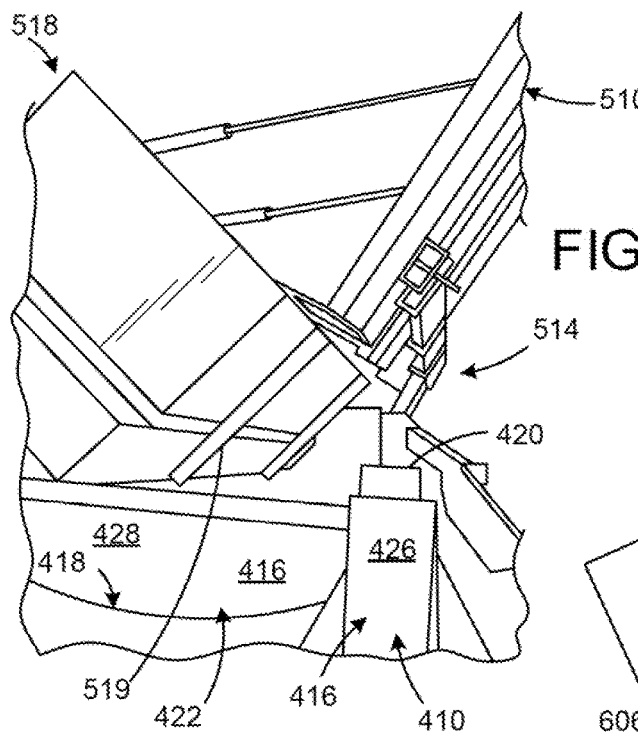
FIG. 53 is another partial perspective view of the vehicle illustrated in FIG. 47. The loading apparatus is illustrated in the dumping position.
Figure 54:
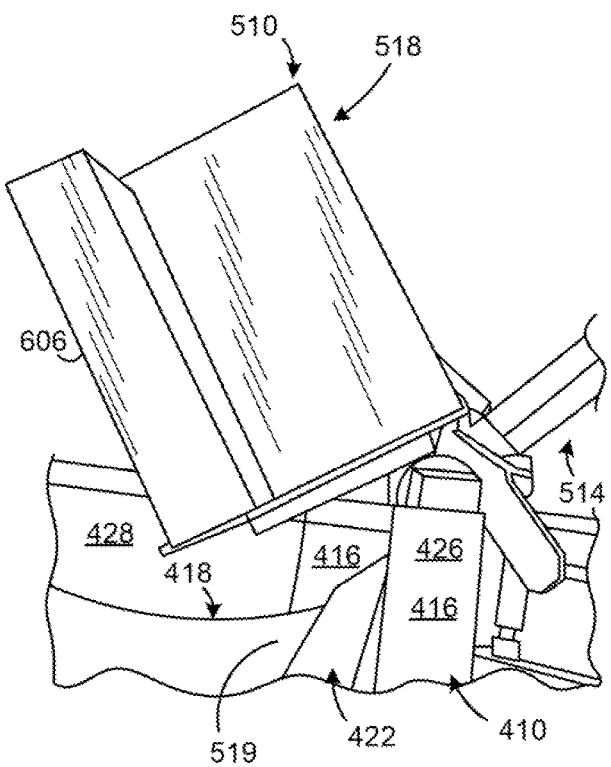
FIG. 54 is another partial perspective view of the vehicle illustrated in FIG. 47. The loading apparatus is illustrated between the dumping position and the loading position.
Figure 55:
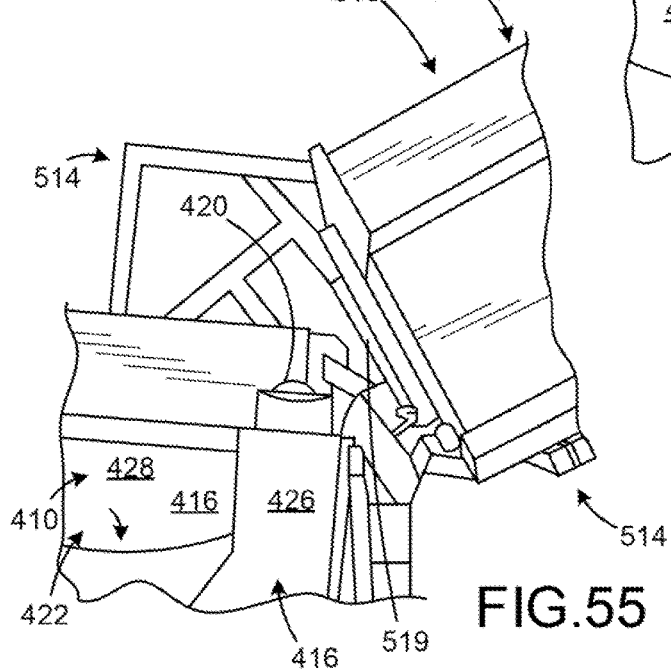
FIG. 55 is another partial perspective view of the vehicle illustrated in FIG. 47. The loading apparatus is illustrated between the dumping position and the loading position.

In the illustrated embodiment, the lift arm second portion 276 has a first elongate member 286, a second elongate member 336, and a third elongate member 338. The first elongate member 276 is attached to the lift arm first portion 274 (e.g., third elongate member 284) and has a lengthwise axis 289 that is parallel to the first mounting member lengthwise axis 231 and the second mounting member lengthwise axis 239, and a second axis 289' disposed orthogonally to the lengthwise axis 289. The first elongate member 286 is attached to the third elongate member 284 such that the lengthwise axis 289 is disposed orthogonally relative to the third elongate member 284 of the lift arm first portion 274 and the second axis 289 is disposed at an angle 291 between about 90 degrees and about 120 degrees relative to the lift arm first portion 274 (e.g., third elongate member 284), as shown in FIG. 42. In the illustrated embodiment, the angle is equal to about 100 degrees relative to the lift arm first portion 274 (e.g., third elongate member 284).

Each of the second elongate member 336 and the third elongate member 338 of the lift arm second portion 276 is attached to the third elongate member 284 of the lift arm first portion 274 and the first elongate member 286 of the lift arm second portion 276. Each of the first elongate member 286, the second elongate member 336, and the third elongate member 338 of the lift arm second portion 276 is disposed in a hypothetical plane 289 that is parallel to the first mounting member lengthwise axis 231 and the second mounting member lengthwise axis 239. The hypothetical plane 289 extends perpendicular to the hypothetical plane 281 on which each of the first elongate member 280, the second elongate member 282, the third elongate member 284, the fourth elongate member 330, the fifth elongate member 332, and the sixth elongate member 334 is disposed. However, alternative embodiments can include a lift arm second portion that is disposed on a hypothetical plane that extends at any suitable angle relative to a mounting member lengthwise axis and/or a hypothetical plane that extends through a slot.

In the embodiment illustrated, the anchor member 216 has an anchor member first end 288, an anchor member second end 290, an anchor member lengthwise axis 293 that extends through the anchor member first end 288 and the anchor member second end 290, and an anchor member main body 292 that defines a plurality of openings 294 and extends from the anchor member first end 288 to the anchor member second end 290. A first set of openings 297 of the plurality of openings 294 is defined on the U-shaped portion of the anchor member 216 and are sized to receive a portion of the first pin 219 to accomplish pivotable attachment of the lift arm 214 to the anchor member 216 such that the lift arm 214 can move within the slot 228. A second set of openings 299 of the plurality of openings 294 is defined on the U-shaped portion and the projection 298 and are sized to receive an attachment member (e.g., screw) to accomplish attachment of the anchor member 216 to a vehicle. A third set of openings 339 of the plurality of openings 294 is defined on the U-shaped portion and are sized to receive attachment pin 312 to accomplish attachment of the actuator 314 to the anchor member 216.

Figure 24:
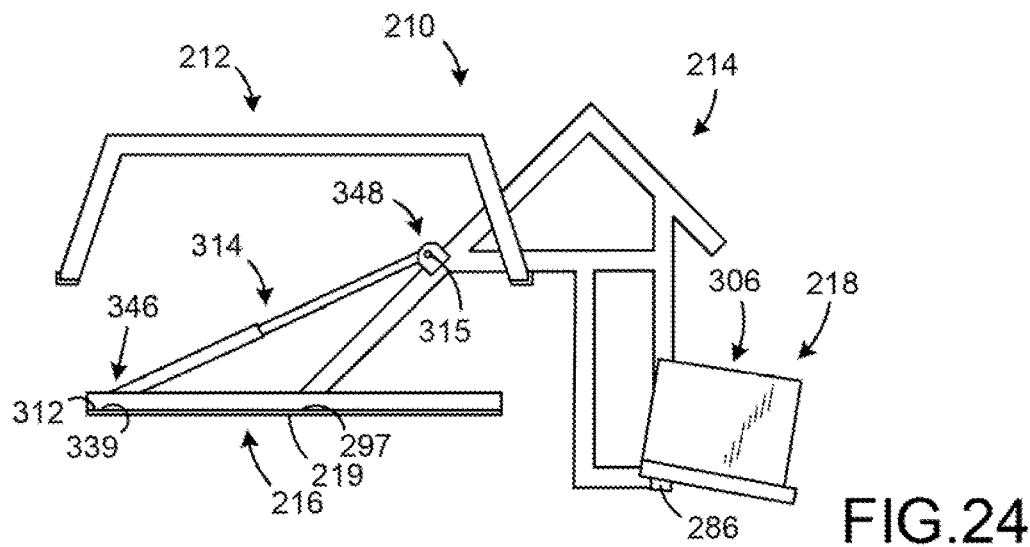
FIG. 24 is a rear view of the loading apparatus illustrated in FIG. 22.
Figure 25:
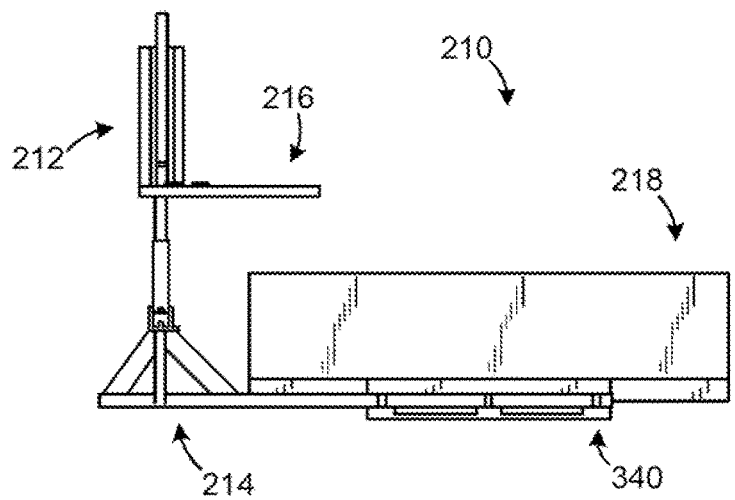
FIG. 25 is a side view of the loading apparatus illustrated in FIG. 22.
Figure 26:
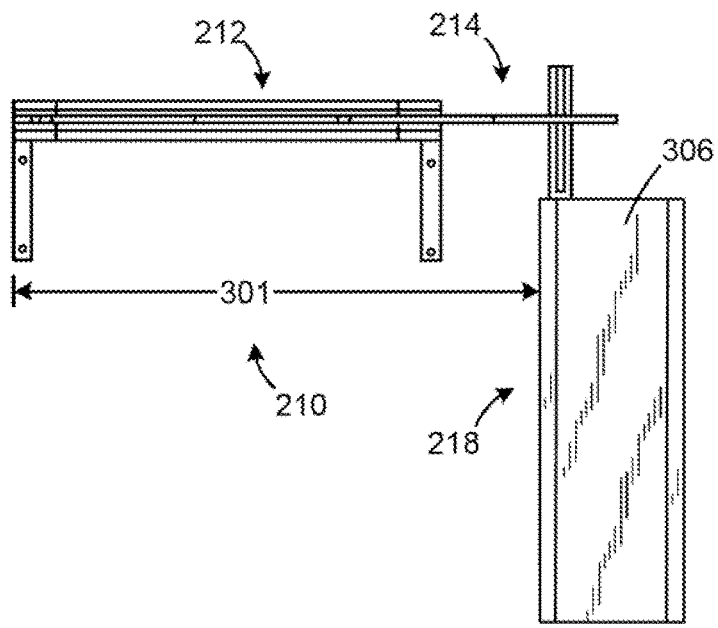
FIG. 26 is a top view of the loading apparatus illustrated in FIG. 22.
Figure 27:
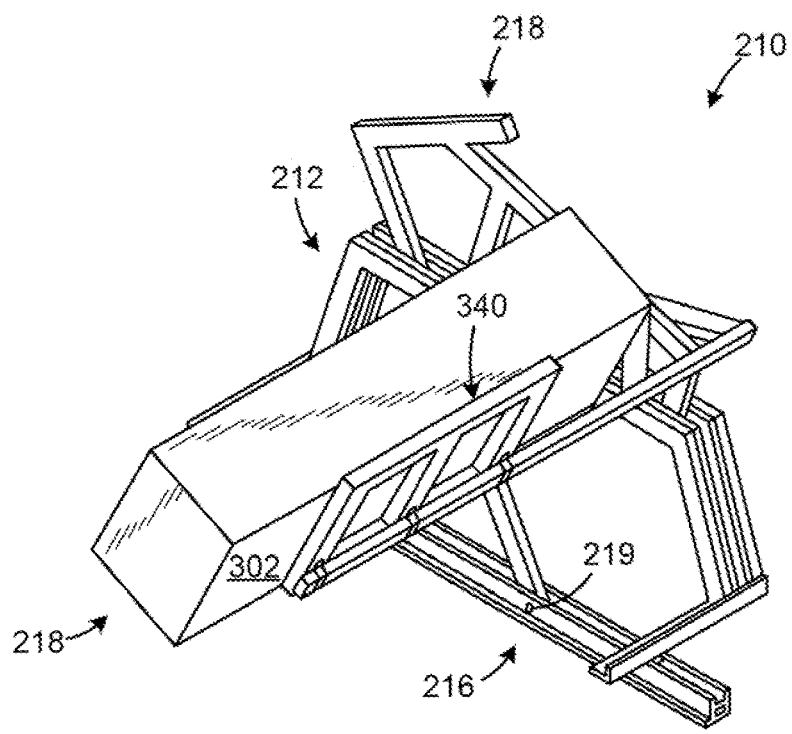
FIG. 27 is another perspective view of the loading apparatus illustrated in FIG. 22. The loading apparatus is illustrated between the loading position and the dumping position.
Figure 28:
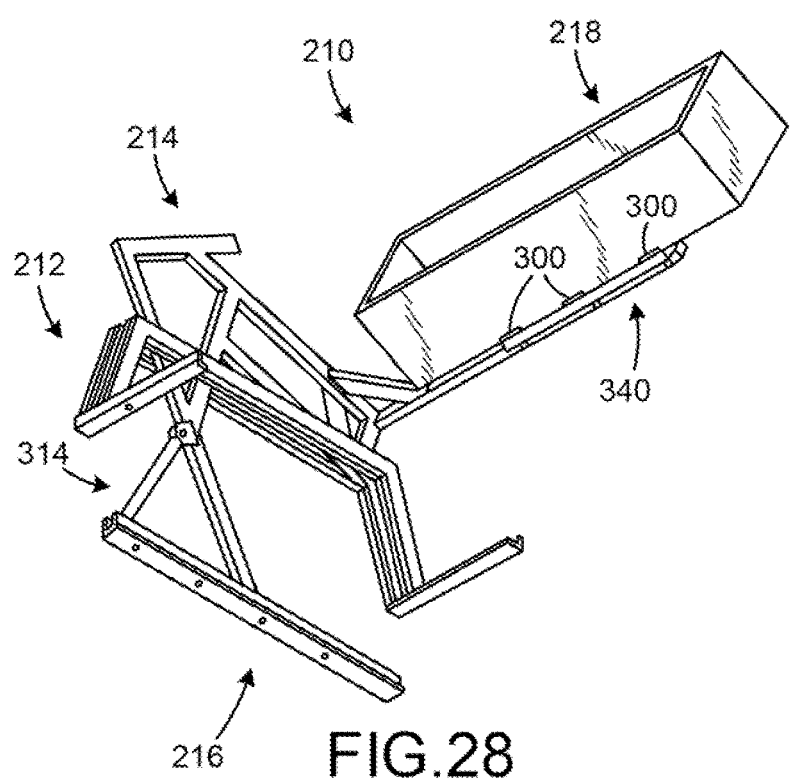
FIG. 28 is another perspective view of the loading apparatus illustrated in FIG. 27.
Figure 29:
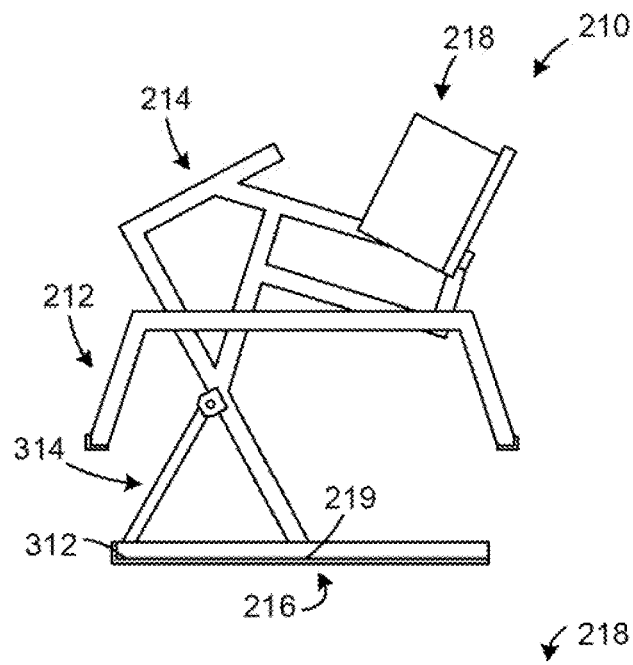
FIG. 29 is a rear view of the loading apparatus illustrated in FIG. 27.
Figure 30:
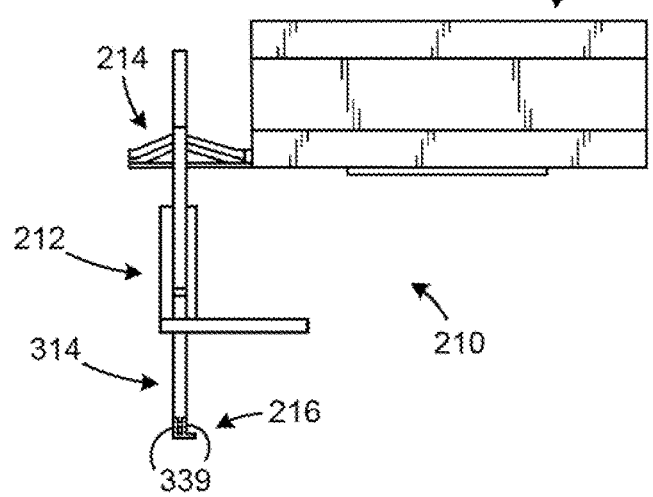
FIG. 30 is a side view of the loading apparatus illustrated in FIG. 27.
Figure 31:
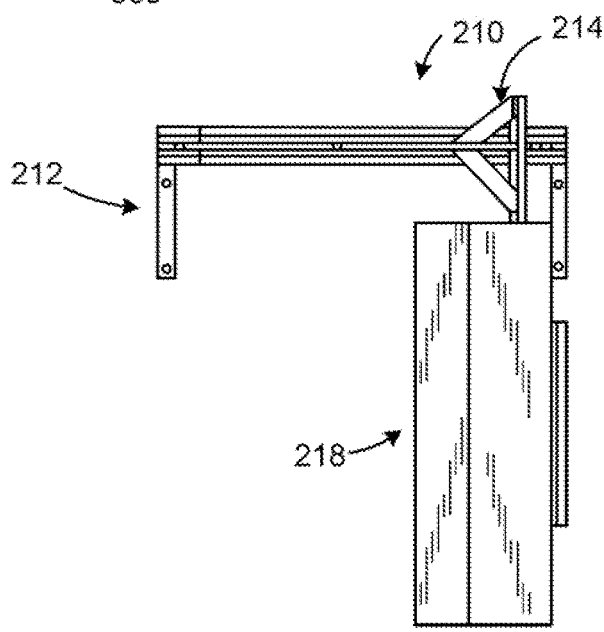
FIG. 31 is a top view of the loading apparatus illustrated in FIG. 27.

In the illustrated embodiment, the container 218 includes a support frame 340 attached to the base 302. The support frame 340 is attached to the lift arm second portion 276 (e.g., first elongate member 286) using a plurality of brackets 342. The container 218 is pivotably attached to the support frame 340 using a plurality of hinges 300. When the lift arm first portion 274 and the lift arm second portion 276 are in the loading position, as shown in FIGS. 22, 23, 24, 25, and 26, the container 218 is positioned in the upright position such that material (e.g., waste) can be placed within the cavity 306. As shown in FIG. 24, as a result of the angled attachment of the first elongate member 286 of the lift arm second portion 276, the container 218 is angled toward a user during use for ease of loading material into the container 218. In the loading position, the support frame 340 of the container 218 is disposed adjacent to the lift arm second portion 276 (e.g., contacts the lift arm second portion 276), the container 218 is disposed adjacent to the support frame 340 (e.g., contacts the support frame 340), and the container 218 is disposed a fifth distance 301 from the first mounting member 220. When the lift arm first portion 274 and the lift arm second portion 276 are in the dumping position, as shown in FIGS. 32, 33, 34, 35, and 36, the container 218 inverts and is positioned in the inverted position such that any material disposed within the cavity 306 empties from the container and is dumped into the vehicle (e.g., bed of a truck) to which the loading apparatus 210 is attached. In the dumping position, the base 302 of the container 218 is disposed at an angle 303 to the support frame 340 that is greater than 90 degrees and the container 218 is disposed a sixth distance 305 from the first mounting member 220 that is less than the fifth distance 301.

A second attachment pin 312 can have any suitable structural arrangement capable of providing pivotable attachment between an actuator 316 and an anchor member 216. In the illustrated embodiment, the second attachment pin 312 is an elongate member (e.g., similar to attachment pin 19) that is sized such that it can be positioned through an opening defined by the actuator 316 and passageways of the plurality of passageways 294 defined by the anchor member 216. Attachment of an attachment pin to an anchor member and/or actuator can be accomplished using any suitable technique or method of attachment. For example, an attachment pin can be welded to an anchor member. While an attachment pin has been illustrated as accomplishing pivotable attachment between an actuator and an anchor member, any suitable structure and/or method of accomplishing pivotable attachment between an actuator and an anchor member can be utilized.

Any suitable actuator can be used in a loading apparatus and selection of a suitable actuator can be based on various considerations, including the intended use of the loading apparatus. Examples of actuators considered suitable to include in a loading apparatus include hydraulic actuators, pneumatic actuators, electrical actuators, mechanical actuators, magnetic actuators, linear actuators, rotary actuators, and any other actuator considered suitable for a particular embodiment. In the illustrated embodiment, the actuator 314 is a hydraulic linear actuator 344 that has an actuator first end 346, an actuator second end 348, and is configured to move the lift arm 214 from the loading position to the dumping position. The actuator first end 346 is attached to the anchor member 216 using one or more attachment members. The actuator second end 348 is attached to the attachment region 326 of the lift arm first portion 274 using the third pin 315 such that the lift arm 214 can pivot relative to the actuator 314.

A third attachment pin 315 can have any suitable structural arrangement capable of providing pivotable attachment between an actuator 316 and a lift arm 214. In the illustrated embodiment, the third attachment pin 315 is an elongate member (e.g., similar to attachment pin 19) that is sized such that it can be positioned through openings defined by the attachment region 326 and an opening defined by the actuator 316. Attachment of an attachment pin to an actuator and/or a lift arm can be accomplished using any suitable technique or method of attachment. For example, an attachment pin can be welded to a lift arm. While an attachment pin has been illustrated as accomplishing pivotable attachment between an actuator and lift arm, any suitable structure and/or method of accomplishing pivotable attachment between an actuator and a lift arm can be utilized.

While particular structural arrangements, angles, and portions have been illustrated for a frame, lift arm, anchor member, container, attachment pin, and an actuator, a frame, lift arm, anchor member, container, attachment pin, and/or an actuator included in a loading apparatus can include any suitable structural arrangement, angles, and/or portions and a loading apparatus can be attached to any suitable vehicle. Selection of a suitable structural arrangement, angles, and/or portions for a frame, lift arm, anchor member, container, attachment pin, and/or an actuator and of a suitable vehicle to attach a loading apparatus, can be based on various considerations, including the material(s) forming a particular component. Examples of vehicles considered suitable to attach a loading apparatus include trucks, pickup trucks, lightweight pickup trucks, heavy-duty pickup trucks, pickup trucks having a dump bed, pickup trucks having extended side rails, full-sized pickup trucks, pickup trucks having any suitable bed length, such as a bed length greater than, less than, or equal to 6 feet or greater than, less than, or equal to 8 feet, pickup trucks having any suitable capacity, such as a capacity greater than, less than, or equal to ¾ tons, and any other vehicle considered suitable for a particular embodiment. A frame, lift arm, anchor member, container, attachment pin, and/or an actuator can be formed of any suitable material and selection of a suitable material can be based on various considerations, including the intended use of the loading apparatus of which the frame, lift arm, anchor member, container, attachment pin, and/or an actuator is a component. Examples of materials considered suitable to form a frame, a lift arm, an anchor member, container, attachment pin, and/or an actuator, include metals, alloys, and any other material considered suitable for a particular embodiment. In the embodiments described herein, each of the frame, lift arm, anchor member, container, attachment pin, and attachment members is formed of a metal. For example, a lift arm can be formed from 3 inch rectangular hardened steel tubing, a mounting member can be formed from 3 inch angle iron, a guide rail can be formed from 3 inch rectangular steel tubing, a container can be formed from diamond plate aluminum, brackets can be formed from galvanized steel, and/or attachment members (e.g., screws, nuts, bolts) can be formed from galvanized steel or stainless steel. Attachment of a loading apparatus to a vehicle can be accomplished using any suitable type of attachment member formed of any suitable material, such as nuts and bolts formed of grade eight strengthened steel.

FIGS. 47 through 55 illustrate a vehicle 410 that includes an example loading apparatus 510. The loading apparatus 510 is similar to the loading apparatus 210 illustrated in FIGS. 22 through 46 and described above, except as detailed below. In the illustrated embodiment, the loading apparatus 510 has a frame 512, a lift arm 514, an anchor member 516, a container 518, a first attachment pin 519, a second attachment pin 612, an actuator 614, and a third attachment pin 615.

In the illustrated embodiment, the vehicle 410 has a chassis 412 and a body 414 that defines a plurality of walls 416 and a base 418. Each wall of the plurality of walls 416 extends from the base 418 to an upper surface 420. The plurality of walls 416 and the base 418 cooperatively define a cavity 422 within which material can be positioned. The plurality of walls 414 includes a first wall 424, a second wall 426, a third wall 428, and a fourth wall 430.

The loading apparatus 510 is attached to the vehicle 410 such that the frame 512 is attached to a portion of the plurality of walls 414 and the anchor member 516 is attached to the base 418. In the embodiment illustrated, the first mounting member 520 is attached to the first wall 424 of the plurality of walls 414 and the second mounting member 522 is attached to the second wall 426 of the plurality of walls 414. The first wall 424 and the second wall 426 of the plurality of walls 414 are opposably facing one another and disposed substantially parallel to one another. The first mounting member 520 and the second mounting member 522 are positioned such that they are closer to a third wall 428 of the plurality of walls 414 than a fourth wall 430 of the plurality of walls. The third wall 428 and the fourth wall 430 of the plurality of walls 414 are opposably facing one another and disposed substantially parallel to one another and perpendicular to the first and second walls 424, 426. The anchor member 516 is attached to the base 418 using a plurality of attachment members 517 that have separately been passed through a passageway of the plurality of passageways 594 to accomplish attachment to the base 418.

As shown in FIGS. 51, 52, 53, 54, and 55, to accomplish movement of the lift arm 514 from the loading position to the dumping position, the lift arm 514 is pulled toward the first mounting member 520 using the actuator 614 such that the lift arm first portion 574 moves from a first distance from the first mounting member 520 when in the loading position to a second distance from the first mounting member 520 when the lift arm 514 is in the dumping position. The first distance is greater than the second distance. In addition, movement of the lift arm 514 from the loading position to the dumping position moves the lift arm second portion 576 from a third distance from the first mounting member 520 when in the loading position to a fourth distance from the first mounting member 520 when the lift arm 514 is in the dumping position. The third distance is greater than the fourth distance. In the loading position, the container 518 is in an upright position and disposed adjacent to an exterior surface of the second wall 426 of the vehicle 410 such that material can be loaded into the cavity 606 defined by the container 518. In the dumping position, the container 518 is in an inverted position, and disposed over the cavity 422 defied by the vehicle 410, such that any material disposed within the cavity 606 is dumped into the cavity 422.

To accomplish movement of the lift arm 514 from the dumping position to the loading position, the lift arm 514 is pushed away the first mounting member 520 using the actuator 614 such that the lift arm first portion 574 moves from the second distance from the first mounting member 520 when in the dumping position to the first distance from the first mounting member 520 when the lift arm 514 is in the loading position. The second distance is less than the first distance. In addition, movement of the lift arm 514 from the dumping position to the loading position moves the lift arm second portion 576 from the fourth distance from the first mounting member 520 when in the dumping position to the third distance from the first mounting member 520 when the lift arm 514 is in the loading position. The fourth distance is less than the third distance. Movement of the container 518 from the dumping position toward the loading position results in a portion of the container 518 (e.g., slides 519 attached to a wall of the plurality of walls 604, which prevent damage to the vehicle 410) contacting the second wall 426 of the vehicle 410. Further movement from the dumping position toward the loading position, results in the container 518 being moved from the inverted position to the upright position via the contact with the second wall 426 of the vehicle 410.

While the vehicle 410 has been illustrated as having a particular structural configuration, a loading apparatus, such as those described herein, can be attached to any suitable vehicle having any suitable structural arrangement and selection of a suitable vehicle to attach a loading apparatus can be based on various considerations, including the intended use of the loading apparatus. Examples of vehicles considered suitable to attach a loading apparatus include trucks, refuse collection vehicles, and any other vehicle considered suitable for a particular embodiment. While the loading apparatus has been illustrated as having particular configurations relative to the vehicle during use, as being attached such that it includes a side loading container, and as being pushed and pulled to accomplish movement between the loading and dumping positions, a loading apparatus can have any suitable configuration relative to a vehicle during use, can be attached such that it includes a side loading container, front loading container, and/or rear loading container, and can be moved between loading and dumping positions using any suitable type of actuator.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A loading apparatus comprising:
    a frame having a first mounting member, a second mounting member, a first guide rail, and a second guide rail, each of the first and second guide rails attached to the first mounting member and the second mounting member and extending from the first mounting member to the second mounting member, the first and second guide rails cooperatively defining a slot;
    a lift arm having a lift arm first end, a lift arm second end, lift arm first portion, and a lift arm second portion, the lift arm first portion extending from the lift arm first end to the lift arm second portion and partially disposed within the slot, the lift arm second portion extending from the lift arm first portion to the lift arm second end, each of the lift arm first portion and the lift arm second portion moveable between a loading position and a dumping position, the lift area first portion disposed a first distance from the first mounting member when in the loading position and a second distance from the first mounting member when in the dumping position, the lift arm second portion disposed a third distance from the first mounting member when in the loading position and a fourth distance from the first mounting member when in the dumping position, the first distance being greater than the second distance, the third distance being greater than the fourth distance; and
    an anchor member attached to the lift arm such that the lift arm is pivotable relative to the anchor member and moveable within the slot;
    wherein the lift arm first portion comprises a first elongate member, a second elongate member, and a third elongate member, the first elongate member pivotably attached to the anchor member, the second elongate member extending from the first elongate member to the third elongate member, and the third elongate member attached to the lift aim second portion; and
    wherein the second elongate member is disposed at an angle relative to the first elongate member that is equal to about 90 degrees.

2. The loading apparatus of claim 1, further comprising a container pivotably attached to the lift arm second portion.

3. The loading apparatus of claim 1, wherein the first mounting member has a first mounting member lengthwise axis;
    wherein the second mounting member has a second mounting member lengthwise axis; and
    wherein the first guide rail is disposed on a first hypothetical plane that is disposed at a first angle relative to the first mounting member lengthwise axis and the second mounting member lengthwise axis.

4. The loading apparatus of claim 3, wherein the first angle is equal to about 90 degrees.

5. The loading apparatus of claim 3, wherein the second guide rail is disposed on a second hypothetical plane that is disposed at a second angle relative to the first mounting member lengthwise axis and the second mounting member lengthwise axis.

6. The loading apparatus of claim 5, wherein the second angle is equal to about 90 degrees.

7. The loading apparatus of claim 3, wherein each of the first mounting member lengthwise axis and the second mounting member lengthwise axis is disposed on a second hypothetical plane that is orthogonal to the first hypothetical plane.

8. The loading apparatus of claim 1, wherein the lift arm second portion has a first elongate member, the first elongate member of the lift arm second portion having a first lengthwise axis and a second axis disposed orthogonally to the first lengthwise axis, the second axis disposed at an angle relative to the lift arm first portion between about 90 degrees and about 120 degrees.

9. The loading apparatus of claim 8, wherein the angle is equal to about 100 degrees.

10. The loading apparatus of claim 1, further comprising an actuator attached to the anchor member and the lift arm.

11. The loading apparatus of claim 10, wherein the actuator is a hydraulic linear actuator.

12. The loading apparatus of claim 1, wherein each of the first elongate member, the second elongate member, and the third elongate member is disposed on a hypothetical plane that extends through the slot.

13. The loading apparatus of claim 1, wherein each of the frame, the lift arm, and the anchor member are formed of a metal.

14. A loading apparatus comprising:
a frame having a first mounting member, a second mounting member, a first guide rail, and a second guide rail, each of the first and second guide rails attached to the first mounting member and the second mounting member and extending from the first mounting member to the second mounting member, the first and second guide rails cooperatively defining a slot;
a lift arm having a lift arm first end, a lift arm second end, a lift arm first portion, and a lift arm second portion, the lift arm first portion extending from the lift arm first end to the lift arm second portion and partially disposed within the slot, the lift arm second portion extending from the lift arm first portion to the lift arm second end, each of the lift aim first portion and the lift arm second portion moveable between a loading position and a dumping position, the lift arm first portion disposed a first distance from the first mounting member when in the loading position and a second distance from the first mounting member when in the dumping position, the lift arm second portion disposed a third distance from the first mounting member when in the loading position and a fourth distance from the first mounting member when in the dumping position, the first distance being greater than the second distance, the third distance being greater than the fourth distance; and
an anchor member attached to the lift arm such that the lift arm is pivotable relative to the anchor member and moveable within the slot:
wherein the lift arm first portion comprises a first elongate member, a second elongate member, and a third elongate member, the first elongate member pivotably attached to the anchor member, the second elongate member extending from the first elongate member to the third elongate member, and the third elongate member attached to the lift arm second portion; and wherein the third elongate member is disposed at an angle relative to the second elongate member that is greater than 90 degrees.

15. The loading apparatus of claim 14, further comprising a container pivotably attached to the lift arm second portion.

16. The loading apparatus of claim 14, further comprising an actuator attached to the anchor member and the lift arm.

17. A loading apparatus comprising:
a frame having a first mounting member, a second mounting member, a first guide rail, and a second guide rail, each of the first and second guide rails attached to the first mounting member and the second mounting member and extending from the first mounting member to the second mounting member, the first and second guide rails cooperatively defining a slot;
a lift arm having a lift arm first end, a lilt arm second end, a lift arm first portion, and a lift arm second portion, the lift arm first portion extending from the lift arm first end to the lift arm second portion and partially disposed within the slot, the lift arm second portion extending from the lift arm first portion to the lift arm second end, each of the lift aim first portion and the lift arm second portion moveable between a loading position and a dumping position, the lift arm first portion disposed a first distance from the first mounting member when in the loading position and a second distance from the first mounting member when in the dumping position, the lift arm second portion disposed a third distance from the first mounting member when in the loading position and a fourth distance from the first mounting member when in the dumping position, the first distance being greater than the second distance, the third distance being greater than the fourth distance; and
an anchor member attached to the lift arm such that the lift arm is pivotable relative to the anchor member and moveable within the slot;
wherein the lift arm first portion comprises a first elongate member, a second elongate member, and a third elongate member, the first elongate member pivotably attached to the anchor member, the second elongate member extending from the first elongate member to the third elongate member, and the third elongate member attached to the lift arm second portion;
wherein each of the first elongate member, the second elongate member, and the third elongate member is disposed on a hypothetical plane that extends through the slot; and
wherein the lift arm first portion has a fourth elongate member, a fifth elongate member, and a sixth elongate member, the fourth elongate member extending from the first elongate member to the third elongate member, the fifth elongate member extending from the fourth elongate member, and the sixth elongate member extending from the fifth elongate member to the third elongate member.

18. The loading apparatus of claim 17, wherein each of the fourth elongate member, the fifth elongate member, and the sixth elongate member is disposed on the hypothetical plane that extends through the slot.

19. The loading apparatus of claim 17, further comprising a container pivotably attached to the lift arm second portion.

20. The loading apparatus of claim 17, further comprising an actuator attached to the anchor member and the lift arm.

* * * * *